United States Patent [19]
Maltz

[11] Patent Number: 5,307,182
[45] Date of Patent: Apr. 26, 1994

[54] METHODS AND APPARATUS FOR MULTIGENERATION COLOR IMAGE PROCESSING

[75] Inventor: Martin S. Maltz, Rochester, N.Y.
[73] Assignee: Xerox Corporation, Stamford, Conn.
[21] Appl. No.: 814,170
[22] Filed: Dec. 30, 1991
[51] Int. Cl.$^5$ ............................................. G03F 3/08
[52] U.S. Cl. .................................. 358/518; 358/504; 358/525; 358/522; 382/51; 382/54
[58] Field of Search ........................ 358/80, 78, 75, 76, 358/447, 448, 453, 450, 466, 81, 518, 504, 515, 525, 522, 406; 382/51, 17, 52, 18, 54; 395/127, 131

[56] References Cited

U.S. PATENT DOCUMENTS

| | | | |
|---|---|---|---|
| 4,275,413 | 6/1981 | Sakamoto et al. | 358/525 |
| 4,907,075 | 3/1990 | Braudaway | 358/75 |
| 4,941,038 | 7/1990 | Walowit | 358/518 |
| 4,974,071 | 11/1990 | Maeda | 358/539 |
| 5,047,842 | 9/1991 | Bouman, Jr. et al. | 358/75 |
| 5,111,286 | 5/1992 | MacDonald et al. | 358/75 |

OTHER PUBLICATIONS

P. Laihanen, "Optimization of Digital Color Reproduction on the Basis of Visual Assessment of Reproduced Images", Proceedings of the SID, vol. 30, No. 3, pp. 183-190 (1989).

P. Laihanen, "Colour Reproduction Theory Based on the Principles of Colour Science", Advances in Printing Science and Technology, Jun. 1987 Conference, Pantech Press, London (1988).

*Primary Examiner*—Mark R. Powell
*Assistant Examiner*—Fan Lee
*Attorney, Agent, or Firm*—Finnegan, Henderson, Farabow, Garrett & Dunner

[57] ABSTRACT

An image processing apparatus and method for performing the steps of grouping colors of a multi-pixel image stored in a memory into sets of colors, determining the average color of each set of colors, selecting a target color, for each set of colors, from a plurality of predetermined target colors, the selected target color being the predetermined target color that is closest to the average color of the set, and remapping the color of each pixel of the image stored in the memory to the target color selected for the set including that pixel. The method and apparatus are applicable to multigeneration color image reproduction devices such as color facsimile machines, color photocopiers, and the like.

27 Claims, 17 Drawing Sheets

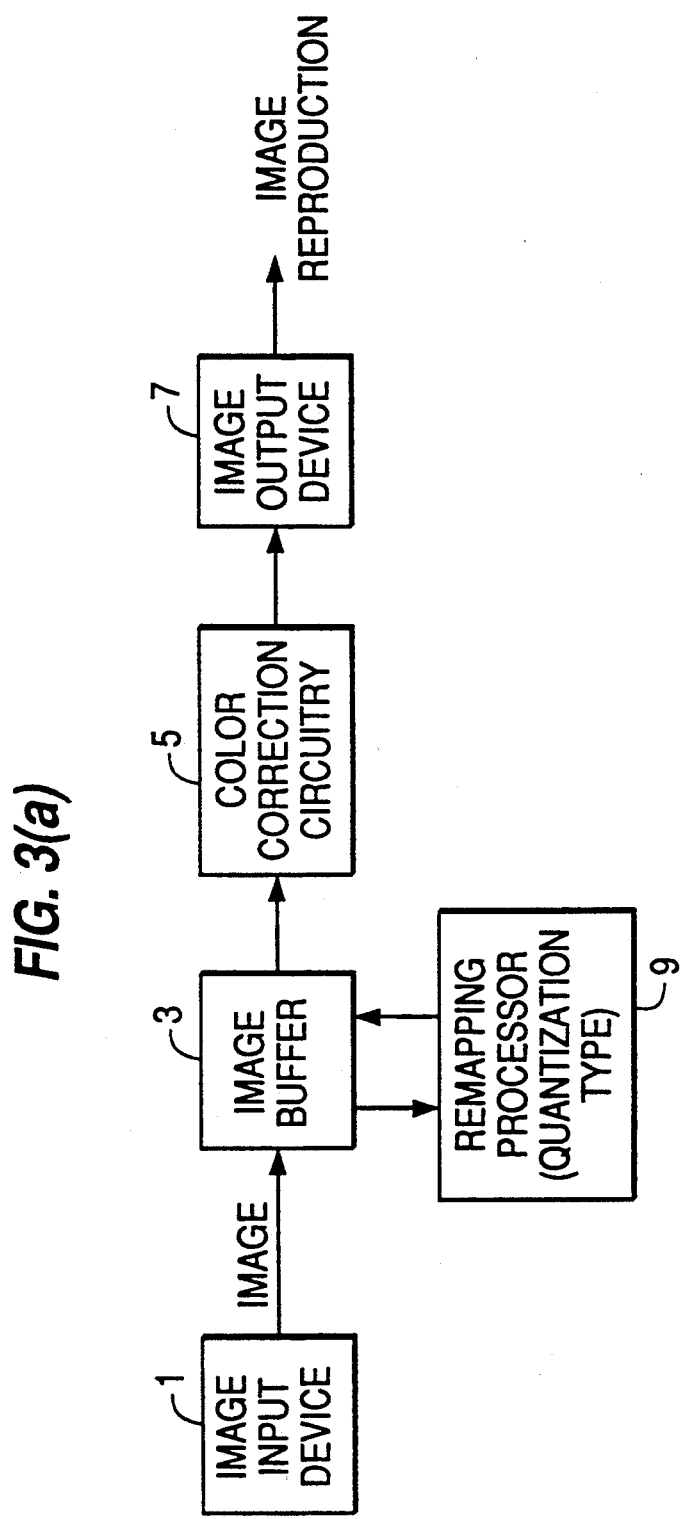

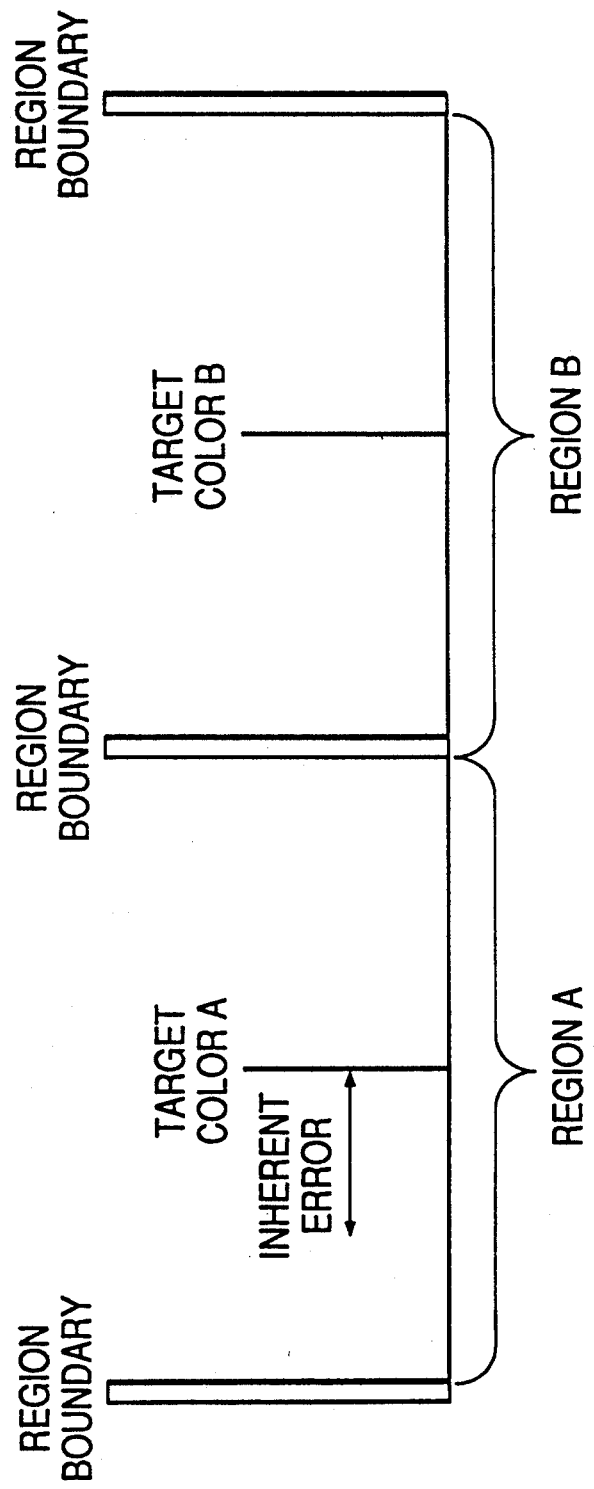

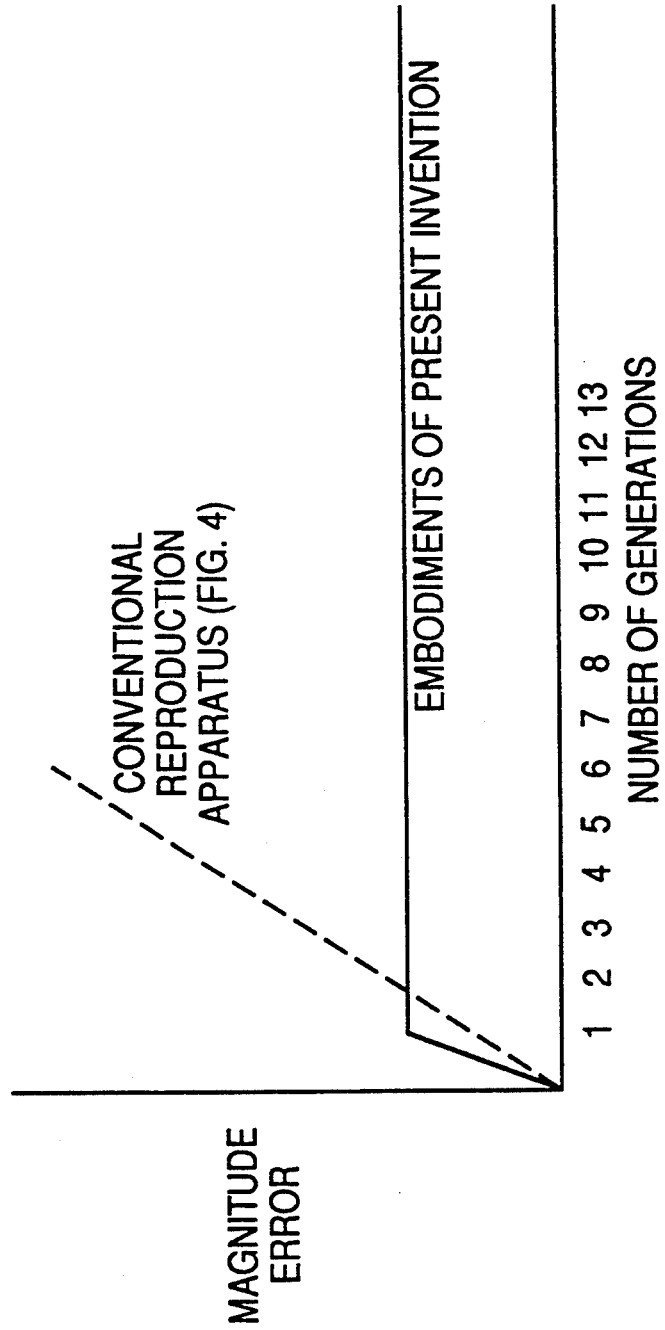

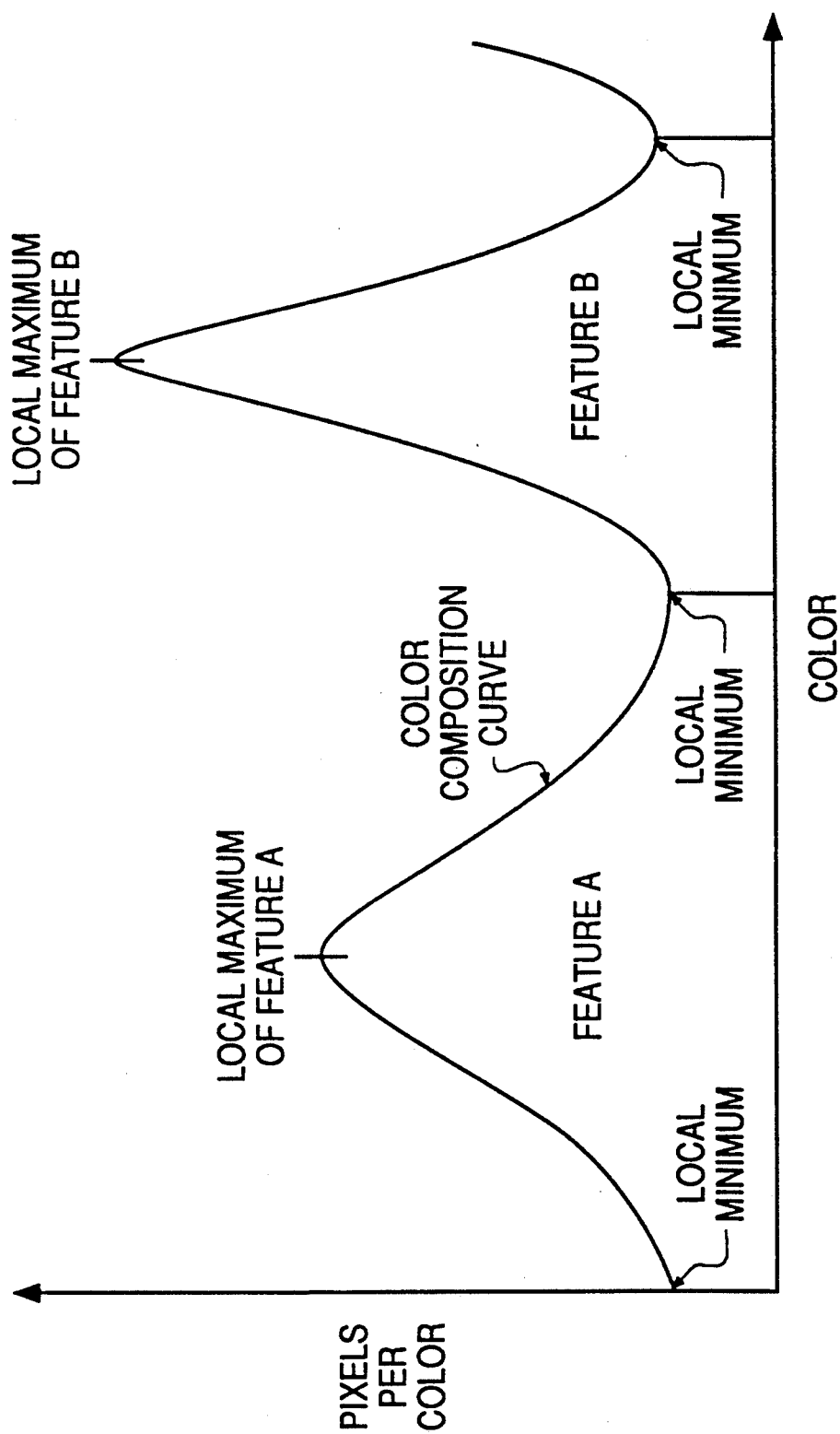

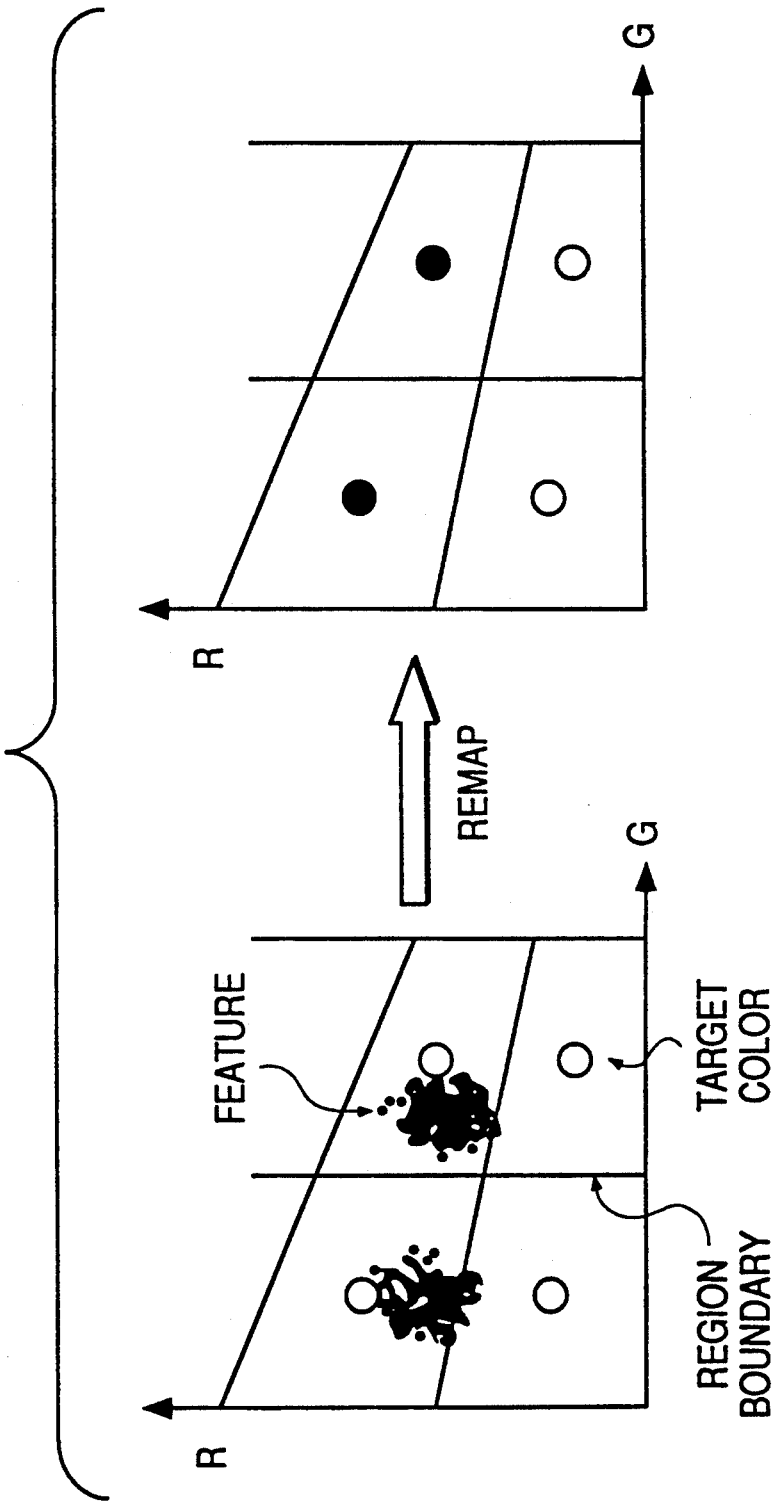

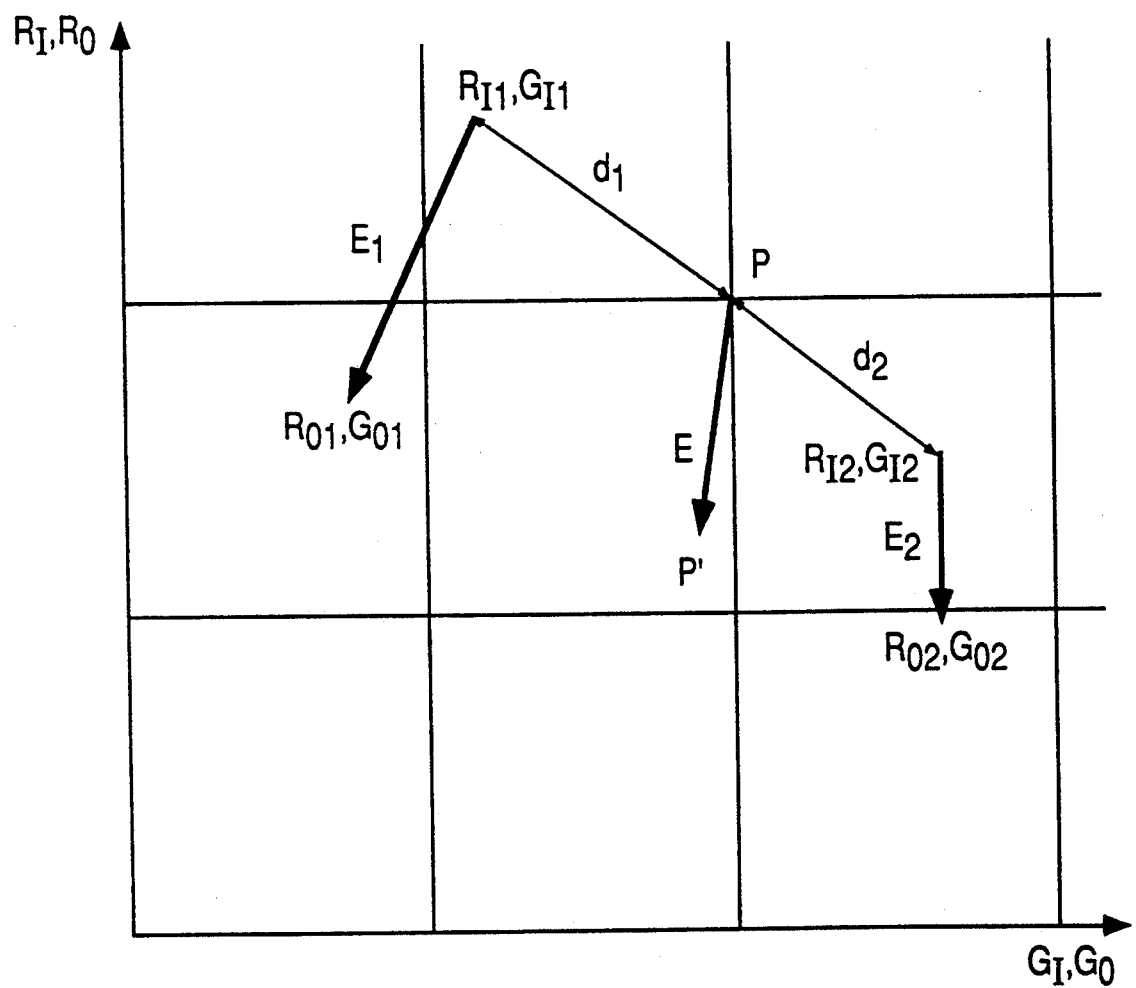

METHODS AND APPARATUS FOR MULTIGENERATION COLOR IMAGE PROCESSING

CROSS REFERENCE

Cross reference is made to U.S. patent application Ser. No. 07/517,895, entitled "Color Editing With Simple Encoded Images," filed by Bollman et al. on May 2, 1990, and assigned to the same assignee as the present application.

BACKGROUND OF THE INVENTION

1. Field of the Invention

The present invention relates to color image processing methods and apparatus for eliminating errors associated with multigeneration color image reproductions. More particularly, the present invention relates to image processing methods and apparatus for eliminating multigeneration color image reproduction errors in color reproduction devices such as color facsimile machines, color photocopiers, and the like.

2. Discussion of the Related Art

U.S. Pat. No. 4,974,071 teaches an apparatus for encoding color image data. Further, U.S. Pat. No. 4,941,038 discloses a method for color image processing.

FIG. 1 shows a conventional image reproduction apparatus. The apparatus includes an image input device 1, for inputting an image to be reproduced, and an image output device 7, for outputting an image reproduction corresponding to the input image. The function of the apparatus is to output an image reproduction which corresponds as closely as possible to the image input by image input device 1.

When reproducing an image (e.g., when making a photocopy of an image displayed on an original document), the image must first be input into the reproduction apparatus. This input function is typically carried out using a standard image input device 1. Various types of image input devices are known. For example, the image can be input using a scanner (as in a photocopier device), or it can be built up by an operator on a CRT and then input from the CRT according to known principles.

After being input, the image (i.e., data representing the image) is stored in an image buffer 3. The image buffer is generally a rewritable memory device such as a RAM (random access memory). If the image to be stored is a color image, then RGB (red, green, blue) values are produced by the image input device 1 and stored in image buffer 3 as the image representation. Alternatively, the image input device 1 could produce L*a*b* (lightness, red-green axis, yellow-blue axis) color space coordinates representing the image to be stored in the image buffer 3. A further alternative would be to convert RGB values produced by the image input device 1 into L*a*b* color space coordinates, and then store the resulting L*a*b* color space coordinates in the image buffer 3 as the image representation.

The representation of a color image using RGB values and L*a*b* color space coordinates is well known, as evidenced by the following articles written by P. Laihanen, incorporated herein by reference: "Optimization of Digital Color Reproduction on the Basis of Visual Assessment of Reproduced Images," Proceedings of the SID, Volume 30, No. 3, pp. 183-190 (1989), and "Color Reproduction Theory Based on the Principles of Colour Science," Advances in Printing Science and Technology, June 1987 Conference, Pantech Press, London (1988). Conversion between RGB values and L*a*b* color space coordinates is also well known.

After storing the image in the image buffer 3, the image is subjected to color correction processing by color correction circuitry 5. The color correction circuitry 5 commonly takes the form of a calibrated device for converting the image data stored in the image buffer 3 to a form that will allow the image output device 7 to output a faithful reproduction of the image input to the image buffer 3 from image input device 1. For example, the color correction circuitry could be a device for converting the image data output from image buffer 3, which is in the form of RGB values or L*a*b* color space coordinate values, into CYM (cyan, yellow, magenta) values, which are applicable for use in the image output device 7.

In apparatus such as the image reproduction apparatus shown in FIG. 1, it is often the case that differences exist between the color characteristics of the image input by the image input device 1 and the color characteristics of the reproduced image output by the image output device 7. Such color errors are usually measured in L*a*b* color space because it is perceptually uniform (e.g., two greens separated by a difference of one unit in L*a*b* color space look as different as two reds separated by the same distance in L*a*b* color space). In L*a*b* color space, the L* axis represents lightness, the a* axis is the red-green axis, and the b* axis is the yellow-blue axis. An example of the representation of a color image in L*a*b* color space is shown in FIG. 2. As can be seen from FIG. 2, the colors contained within the image lie within an identified volume 100, which is called the color gamut of the image.

With reference to FIG. 2, it is known that a color difference as small as one or two L*a*b* units is just noticeable under ideal conditions (e.g., where low noise colors are positioned adjacent to each other). However, much larger errors are acceptable between an original image to be reproduced and the reproduction of the image (e.g., a photocopy reproduction of the image). For example, opaque copies made of opaque originals using photographic techniques generally have RMS (root mean square) color errors of about 15 L*a*b* units, where the average is taken over the set of colors found in standard color checker apparatus. Zerographic digital copiers are known to perform much better. For example, various models of zerographic digital copiers have been known to have color errors in the range 7 to 12 L*a*b* units.

In multigeneration copying (i.e., the making of copies using copies as originals), however, the color errors generally build up with each generation of copies. For example, in xerographic digital copiers, the RMS error between the original and a third generation copy (i.e., a copy of a copy of a copy of the original) is 25 to 30 L*a*b* units, which is a very large fraction of the distance from one side of the useful region of L*a*b* color space (about 100 L*a*b* units) to the other. As a result, a third generation copy is usually an unacceptable reproduction.

A major advantage that black and white image reproduction apparatus have over color image reproduction apparatus is that black and white image reproduction apparatus are capable of making high quality reproductions of reproductions (i.e., high quality copies of copies). High quality multiple generation copies can be made of high contrast black and white originals (as opposed to gray originals) in black and white image reproduction apparatus because the images of such originals can be easily quantized. Nevertheless, because it is difficult to quantize color originals, multigeneration reproductions or copies produced by color image reproduction apparatus are low in quality (i.e., high in errors) as compared to miltigeneration reproductions produced by black and white color image reproduction apparatus.

SUMMARY OF THE INVENTION

The present invention has been made in view of the above circumstances and, in accordance with one aspect of the present invention, an arrangement is provided that is capable of producing high quality multi-generation color image reproductions.

In accordance with another aspect of the present invention, an arrangement is provided wherein pictorial images and graphics with color sweeps can be accurately reproduced and undesirable effects, such as contouring and the production of jagged edges, can be avoided.

Additional features and advantages of the invention will be set forth in part in a description which follows and in part will be obvious from the description, or may be learned by practice of the invention. The features and advantages of the invention may be realized and attained by means of the instrumentalities and combinations particularly pointed out in the appended claims.

As embodied and broadly described herein, an image processing method of the present invention, performed by a data processing system having a memory, comprises grouping colors of a multi-pixel image stored in the memory and having a color composition into sets of colors; determining the average color of each set of colors; selecting a target color, for each set of colors, from a plurality of predetermined target colors, the selected target color being the predetermined target color that is closest to the average color of the set; and remapping the color of each pixel of the image stored in the memory to the target color selected for the set including the pixel.

Another image processing method of the present invention, performed by a data processing system having a memory, comprises grouping colors of a multi-pixel image stored in the memory and having a color composition into sets of colors; determining the average color of each set of colors; selecting a target color for each set of colors from a plurality of predetermined target colors, the selected target color being the predetermined target color that is closest to the average color of the set; determining, for each set, a difference in color between the average color of the set and the target color selected for the set; remapping the color of each pixel of the image stored in the memory that has the average color of one of the sets to the target color selected for the set; and remapping the color of each pixel of the image stored in the memory that has a color of one of the sets other than the average color of the set to a color determined by the color difference between the average color of the set and the target color selected for the set, and the color differences determined for other ones of the sets of colors.

Elements of the image processing methods described above can be combined to produce yet another image processing method in accordance with the present invention, wherein pixels from non-boundary portions of an image to be reproduced are remapped in accordance with principles utilized in the former of the image processing methods, and pixels from boundary portions of the image to be reproduced are remapped in accordance with principles utilized in the latter of the image processing methods.

In addition to the above methods, the present invention also comprises apparatus for performing such methods.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings:

FIG. 3(a) is a block diagram of an image reproduction apparatus in accordance with a first embodiment of the present invention;

FIG. 4 is a schematic representation of several regions included in a single dimension of L*a*b* color space;

FIG. 7 is a graph comparing the performance of the embodiments of the present invention with conventional image reproduction apparatus;

FIG. 9 is a color space histogram including a curve representing color characteristics of a stored image;

FIG. 10 is a schematic representation showing remapping in two dimensions of RGB color space using a histogram-type remapping processor;

FIG. 14 is a schematic representation in RGB color space showing a weighting function associated with the type of remapping performed by the warping-type remapping processor.

DETAILED DESCRIPTION OF THE EMBODIMENTS

FIG. 3(a) shows an image processing device in accordance with a first embodiment of the present invention. The apparatus shown in FIG. 3(a) is similar to the conventional apparatus shown in FIG. 1, except that it includes a quantization-type remapping processor 9 operatively coupled to the image buffer 3. The quantization-type remapping processor 9 operates in accordance with software stored in a memory (not shown). In other words, the quantization-type remapping processor 9 operates by performing instructions of the stored software.

The term "remapping," as used throughout the instant specification, means altering the color of an image or image pixel. Thus, the remapping of an image pixel entails modifying the color coordinates of the pixel (e.g., changing the color coordinates stored for that pixel in the image buffer 3), while the remapping of an image entails the remapping of at least one of the pixels of the image.

Figure 1:
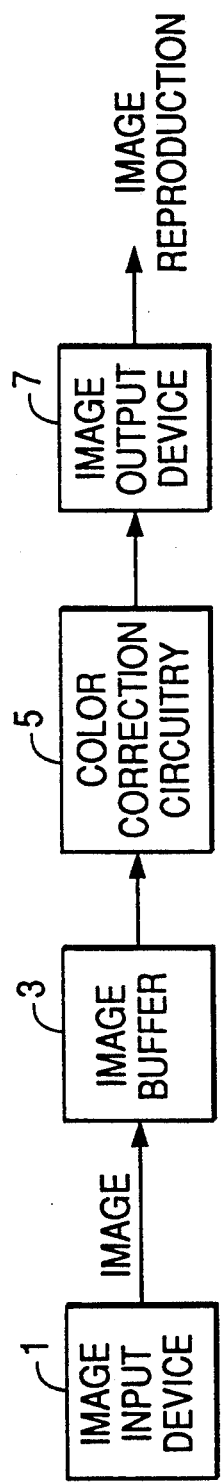
FIG. 1 is a block diagram of a conventional image reproduction apparatus.
Figure 2:
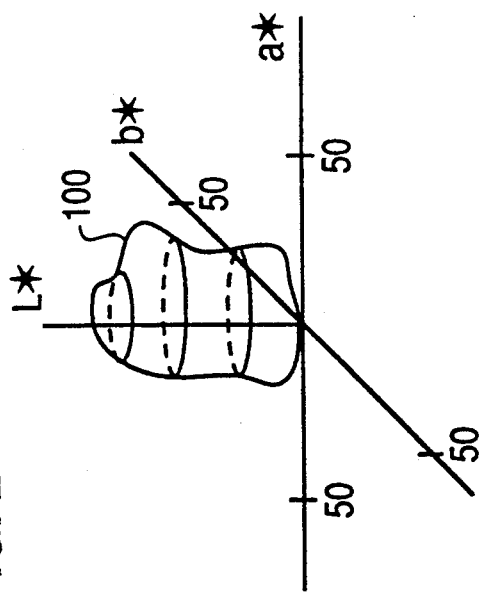
FIG. 2 is an illustration of an example of a representation of a gamut of a color image in L*a*b* color space.

Compared to the conventional color image reproduction apparatus illustrated in FIG. 1, the apparatus shown in FIG. 3(a) provides improved multigeneration color image reproductions. Through the provision of the quantization-type remapping processor 9, the image stored in the buffer can be remapped before color correction circuitry 5 receives the image. In this manner, color errors can be reduced, and the correspondence between the original image and subsequent multigeneration reproductions can be more closely matched.

With reference to FIG. 3(a), the quantization-type remapping processor 9 is designed to remap the colors of the image stored in the image buffer 3 so that the image will be converted to a form that can be accurately reproduced through multiple generations of copies. In operation, the quantization-type remapping processor 9 analyzes the image stored in the image buffer and, based on this analysis, remaps each color of the stored image to a target color selected from a target color table stored in memory (e.g., a RAM or ROM included in the remapping processor 9).

As shown in FIG. 4, which is a schematic representation of one dimension of color space, each selected target color is located within a corresponding region of color space. For example, in FIG. 4, target color A is located within region a, and target color B is located within region B. The quantization-type remapping processor 9 analyzes the color of each pixel of the image stored in image buffer 3, and performs a color remapping function. The color remapping function entails the remapping of the color of each image pixel stored in the image buffer to the target color that is located within the region including the color of that image pixel. In this manner, the colors of the image stored in image buffer 3 are all remapped such that the original image stored in image buffer 3 is replaced, in the image buffer, by an image representation made up entirely of target colors from the target color table stored in memory. Alternatively, if an additional image buffer is used, the remapped image can be stored in the additional image buffer and the original image stored in image buffer 3 need not be replaced.

Figure 3B:
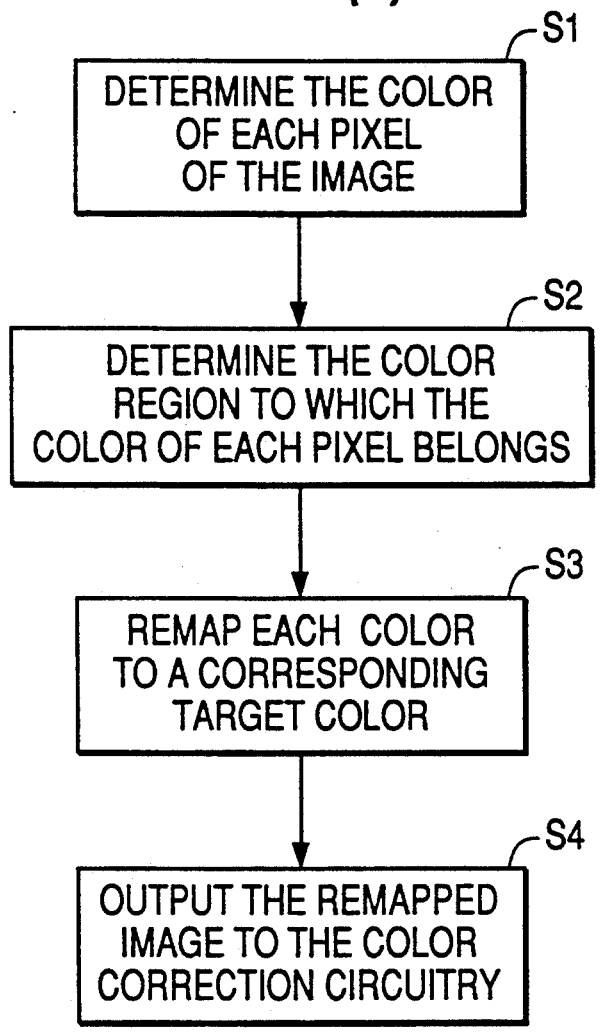
FIG. 3(b) is a flow chart illustrating a method performed by the image reproduction apparatus illustrated in FIG. 3(a)

A flow chart illustrating the function of the apparatus shown in FIG. 3(a) is illustrated in FIG. 3(b). With reference to FIG. 3(b), the remapping processor determines the color of each pixel of the image stored in image buffer 3 (step S1), and then determines the region in color space, such as the regions illustrated in FIG. 4, to which the color of each image pixel belongs (step S2). Next, the color of each pixel of the stored image is remapped by the quantization-type remapping processor 9 to a corresponding target color, i.e., the target color associated with the color region including the color of the pixel (step S3). Thereafter, the remapped image from image buffer 3 is output to the color correction circuitry 5 (step S4), where it is subjected to a color correction procedure.

In order for the apparatus of FIG. 3(a) to produce reliable, error-free multigeneration reproductions, the color regions (e.g., Regions A and B of FIG. 4) used to perform remapping must be large enough so that boundary cross-overs will not occur during any single generation reproduction. If the regions are too narrow, the possibility exists that boundary cross-overs will occur, i.e., the color remapped to the target color for Region A may print as a color from Region B.

Figure 5A:
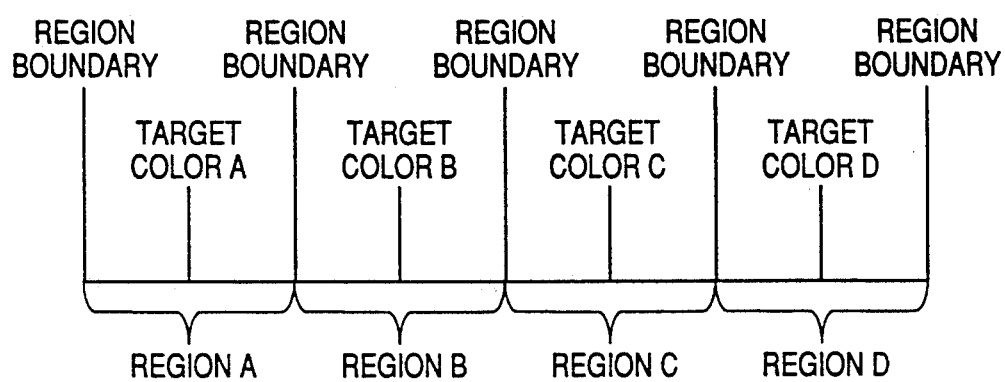
FIG. 5(a) is a schematic representation of a single dimension of L*a*b* color space divided into four color regions.

In the apparatus shown in FIG. 3(a), it is assumed that the boundary crossing rates will be acceptably low if the distance between the boundary of each region and the target color in the region is twice the RMS error of the copying or reproduction process (i.e., the inherent error). Thus, the distance between adjacent target colors should be at least four times the inherent error of the reproduction process. For example, in a system having an inherent error of 7 L*a*b* units, the interval between target colors would be selected to be 28 L*a*b* units, or four times the inherent error of the reproduction process performed by the system. As shown in FIG. 5(a), approximately four regions of this width (i.e., 28 L*a*b* units) can be fitted into each of the three dimensions of color space, yielding approximately 64 (i.e., $4^3$) distinct target color possibilities.

Figure 5B:
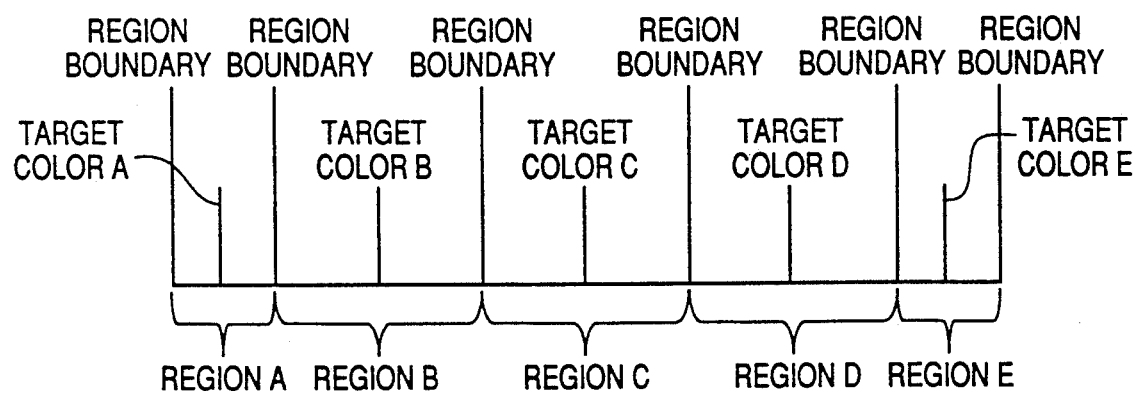
FIG. 5(b) is a schematic representation of a single dimension of L*a*b* color space divided into five color regions.

On the other hand, as shown in FIG. 5(b), five color regions can also be fitted into each of the three dimensions of color space, if regions having a narrower width than 28 L*a*b* units are used (e.g., if the two outer regions have a width of 14 L*a*b* units and the three inner regions have a width of 28 L*a*b* units). If five regions are fitted into each of the three dimensions of color space rather than four, the number of distinct target color possibilities increases from approximately 64 to approximately 125 (i.e., $5^3$).

The color regions in FIGS. 5(a) and 5(b) each include a target color selected from a simple cubic lattice of predetermined target colors. The use of a simple cubic lattice for representing the available target colors is inefficient, however, because the target colors at the corners of the cubic lattice are farther apart than the sides of the lattice (i.e., the corners of the cubic lattice are separated by a distance that is approximately 1.732 times the distance between adjacent corners of the cubic lattice). Thus, it is preferable to use a body centered cubic lattice (i.e., a cubic lattice having an additional target color located at the center of the diagonal of the lattice) to represent the available target colors, so that the inefficiency associated with the simple cubic lattice can be avoided. By using a body centered cubic lattice instead of a simple cubic lattice, the number of distinct target color possibilities increases to approximately 179 (i.e., 125+64), while the smallest distance between target colors decreases by only about 13%.

Although the apparatus shown in FIG. 3(a) reduces multigeneration color drift by ensuring that each generation of reproductions will correspond closely to the first reproduction, the first reproduction itself does not correspond exactly to the original because of a quantization error which occurs during the copying or reproducing of the original. In other words, a quantization error occurs in the first generation reproduction of the multigeneration reproductions, such that the first generation reproduction does not correspond exactly to the original. In the apparatus of FIG. 3(a), the RMS value of the quantization error may be up to half the size of one of the color regions. For example, the RMS value of the quantization error can be as large as 14 L*a*b* units in a system or apparatus wherein the color regions have a width of 28 L*a*b* units.

The total first generation reproduction error is due to phenomena associated with the quantization process, and inherent noise. Using the square-root-of-sum-of-squares rule for combining these two uncorrelated types of errors, the total first generation reproduction RMS error, for a system or apparatus wherein regions having a width of 28 L*a*b* units are used, is approximately 16 L*a*b* units (i.e., around the order generally associated with photographic printing processes). This magnitude of error is acceptable for a wide class of applications.

Figure 6:
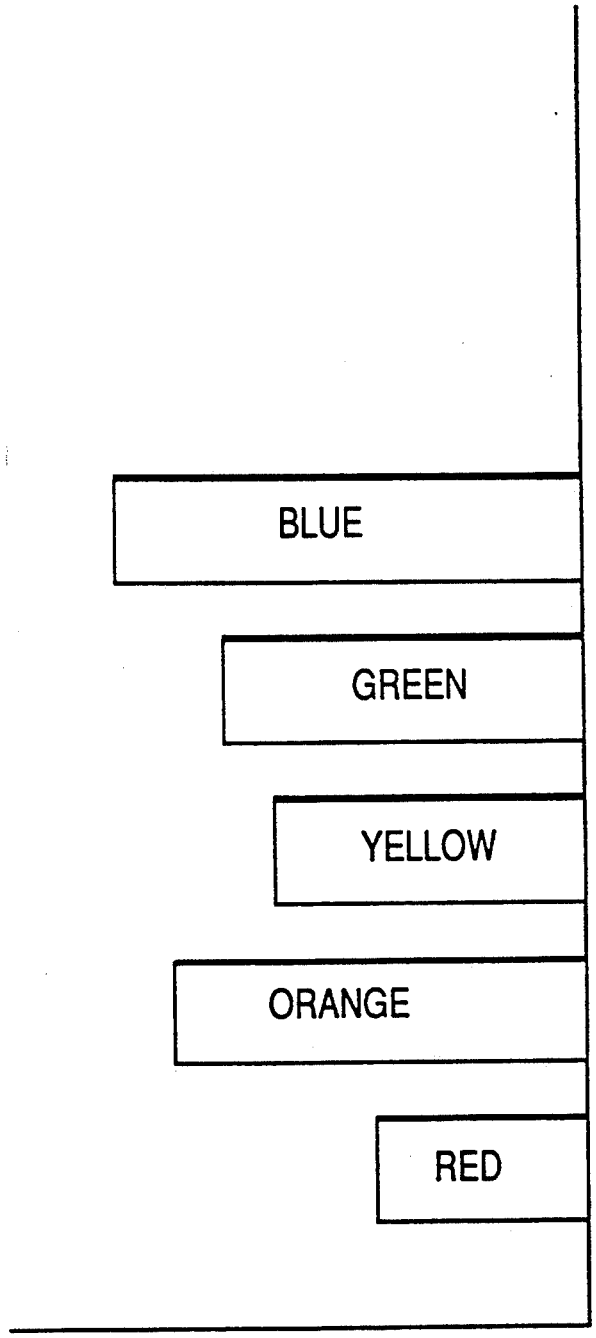
FIG. 6 is a bar chart including separate bars, which each have a different color.

The approach taken in the first embodiment of the present invention (i.e., the embodiment shown in FIG. 3(a)) is not entirely satisfactory, however, because the colors in the original image will often lie near one of the color region boundaries. For example, in an original image including a colored bar chart such as that shown in FIG. 6, each colored bar may include colors that lie near one of the color region boundaries.

Due to imperfections in the original document image to be reproduced, and the scanning process used to reproduce the image of the original document, each solid color patch (e.g., the color of each bar shown in FIG. 6) of the original image may actually be distributed over a significant volume of color space. For example, while the red bar included in the bar chart shown in FIG. 6 may appear to be a solid patch of red to an observer, the red bar may actually include several shades of red. Further, if these shades of red are near to the boundary of a color region, these shades may extend from one color region (such as Region A of FIG. 5(a)) to another color region (such as Region B of FIG. 5(a)). In other words, the color range of the red bar may be intersected by a color region boundary. If the color range of the red bar is intersected by a color region boundary, when remapping the bar chart of FIG. 6 using the apparatus shown in FIG. 3(a), some portions of the red bar will be remapped to a first target color, while some portions of the red bar will be remapped to a second target color. The result of this is that rather than appearing as a solid red patch, the color of the red bar of the bar chart shown in FIG. 6 will be "broken up," or subdivided into colors having distinct color boundaries. Such a result is unacceptable. Thus, it is apparent that the apparatus shown in FIG. 3(a), while an improvement over the conventional apparatus shown in FIG. 1, may not produce satisfactory copies or reproductions of original documents including solid color patches which are distributed over a significant volume of color space.

The apparatus illustrated in FIG. 3(a) also may not produce entirely satisfactory reproductions of graphic images including color sweeps (i.e., gradual sweeps from one color to another within an element of the image). For example, if the first bar shown in FIG. 6 were not red, but rather, solid green at the bottom, solid red at the top, and colored in the middle with hues gradually progressing from solid green to solid red, a reproduction of the bar using the apparatus shown in FIG. 3(a) would not be entirely satisfactory due to the contouring, which is the subdivision of a gradual color sweep into colors having distinct color boundaries.

Figure 8A:
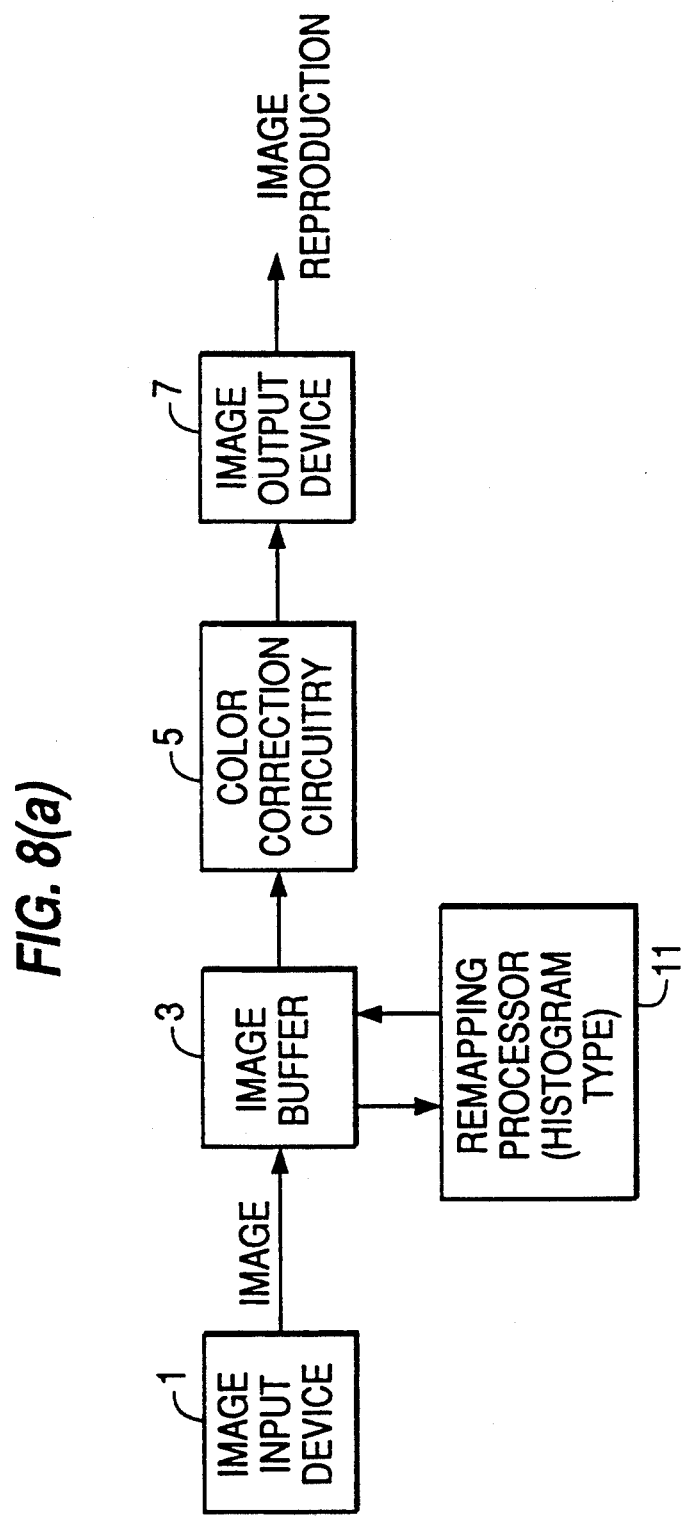
FIG. 8(a) is a block diagram of an image reproduction apparatus in accordance with a second embodiment of the present invention.
Figure 11A:
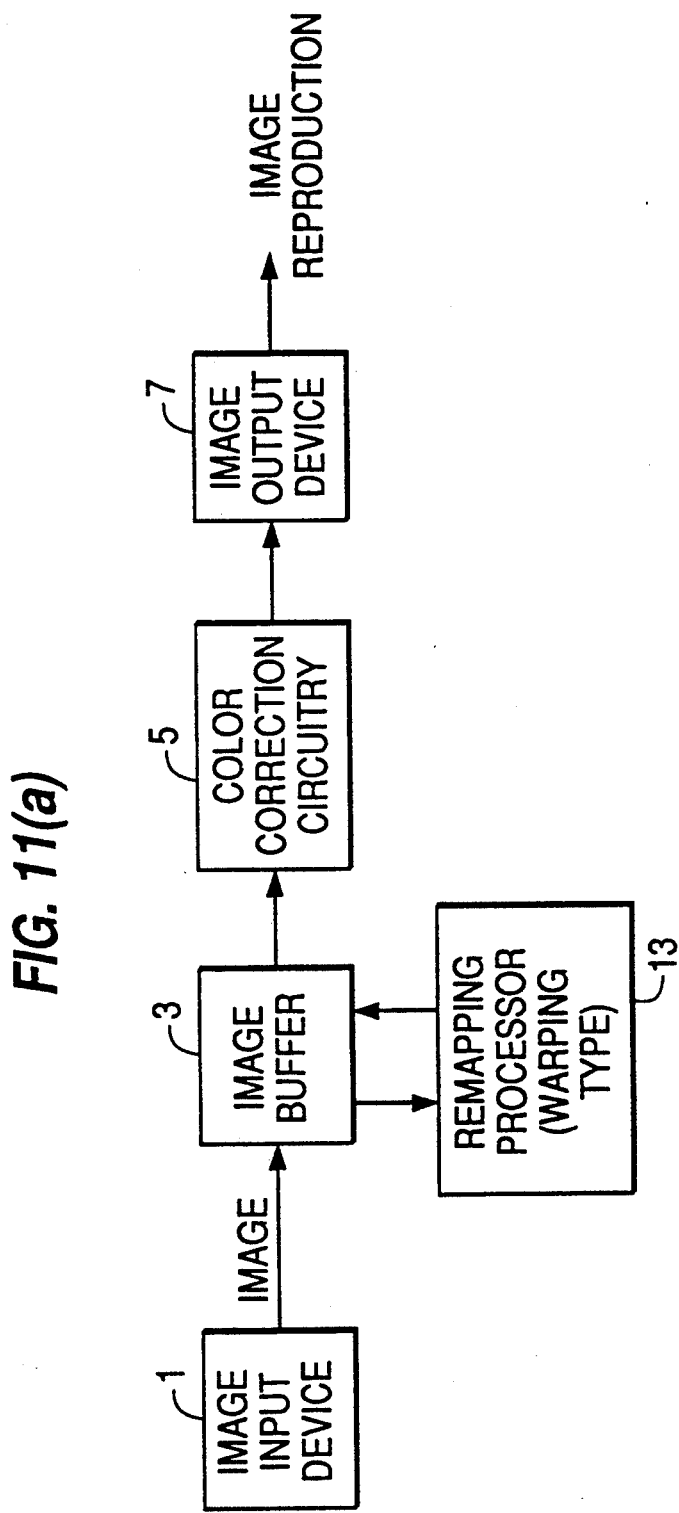
FIG. 11(a) is a block diagram of an image reproduction apparatus in accordance with a third embodiment of the present invention.
Figure 13A:
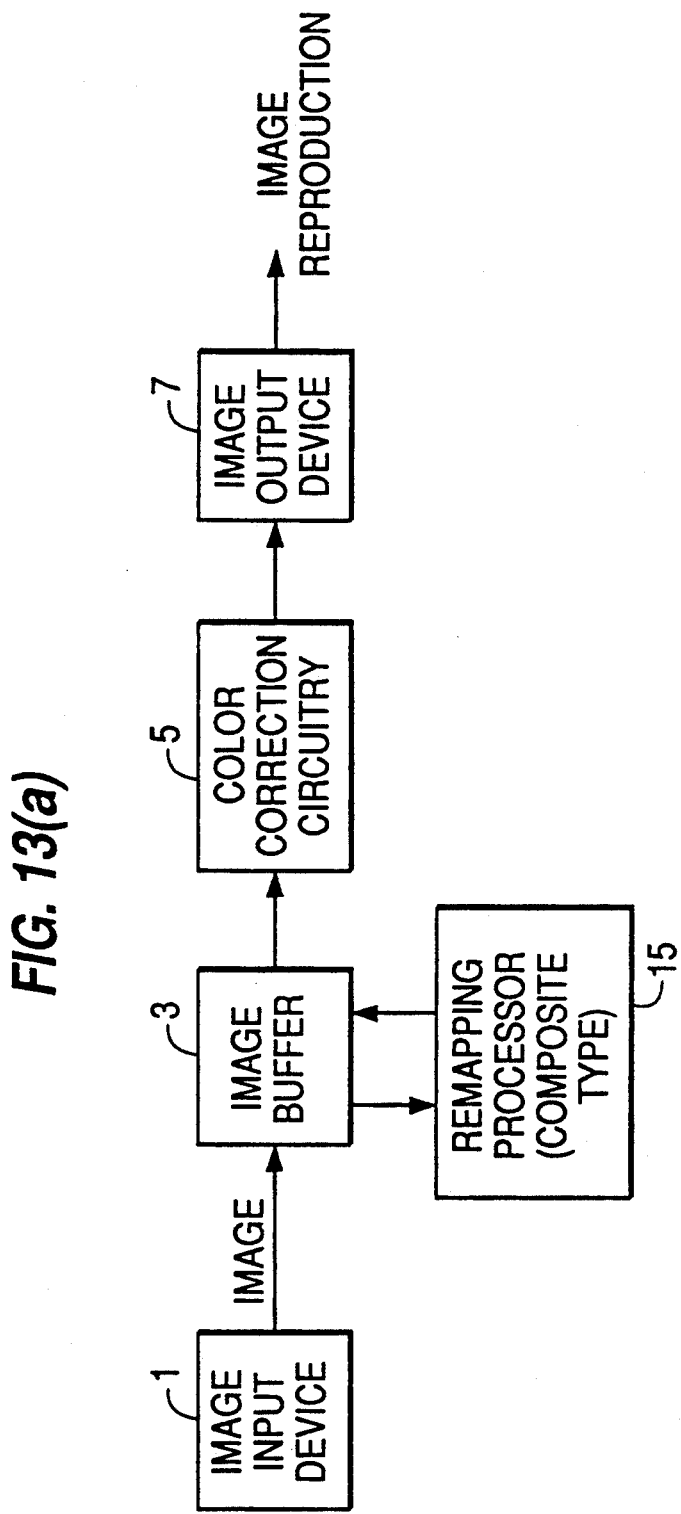
FIG. 13(a) is a block diagram of an image reproduction apparatus in accordance with a fourth embodiment of the present invention.

A graph comparing the results produced by the conventional apparatus shown in FIG. 1 and the embodiments of the present invention (e.g., the first embodiment shown in FIG. 3(a), the second embodiment shown in FIG. 8(a), the third embodiment shown in FIG. 11(a), or the fourth embodiment shown in FIG. 13(a)) is illustrated in FIG. 7. Because the conventional apparatus does not perform quantization or a remapping including the use of target colors, quantization errors do not occur during the first generation reproduction. Nevertheless, as the number of reproductions increases, reproduction errors also increase to an unacceptable level. In other words, with each copy generation, the number of differences between the original document and the image output by the conventional reproduction apparatus increases. The embodiments of the present invention, on the other hand, produce a high quality reproduction of the first generation copy or reproduction, but the first generation copy itself, upon which all subsequent multigeneration reproductions are based, includes errors due to the performance of the quantization function, and inherent noise.

To minimize the break up associated with the apparatus shown in FIG. 3(a), the quantization-type remapping processor 9 of the first embodiment of the present invention can be replaced by a histogram-type remapping processor 11, as shown in FIG. 8(a). The apparatus shown in FIG. 8(a) generally corresponds to the apparatus shown in FIG. 3(a), except that the quantization-type remapping processor 9 of FIG. 3(a) has been replaced by the histogram-type remapping processor 11.

The histogram-type remapping processor 11 operates in accordance with software stored in a memory (not shown). In other words, the histogram-type remapping processor 11 operates by performing instructions of the stored software. The details of histogram-type processor 11 will be discussed in greater detail below.

Like the embodiment of the present invention shown in FIG. 3(a), the apparatus shown in FIG. 8(a) uses an image input device 1 for inputting an image to be reproduced into an image buffer 3. Also, like the apparatus shown in FIG. 3(a), the apparatus shown in FIG. 8(a) remaps the image stored in image buffer 3 using a remapping processor. However, the histogram-type remapping processor 11 of FIG. 8(a) performs color remapping of the image stored in image buffer 3 in a manner which is different from the image remapping performed by the quantization-type remapping processor 9 of FIG. 3(a).

Figure 8B:
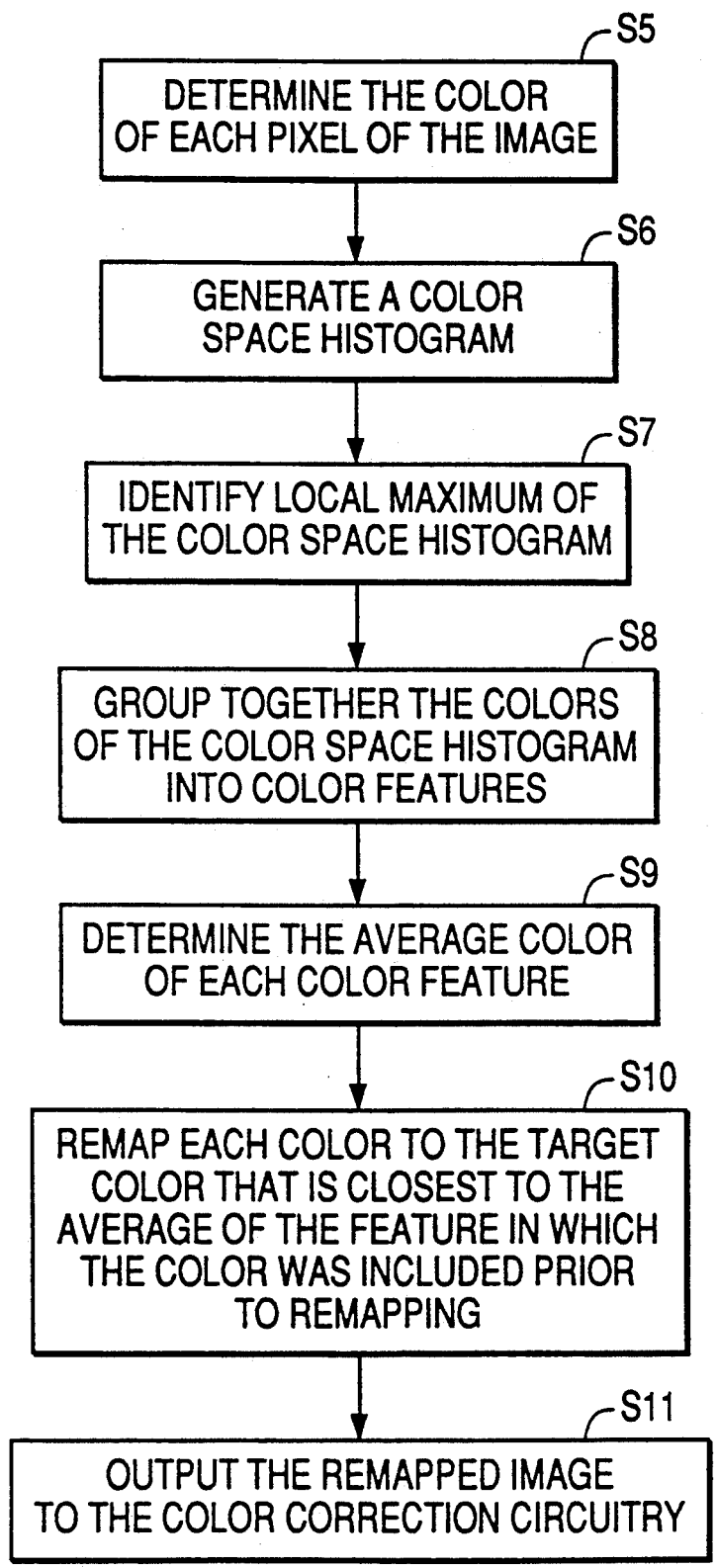
FIG. 8(b) is a flow chart illustrating a method performed by the image reproduction apparatus illustrated in FIG. 8(a)

The histogram-type remapping processor 11 of FIG. 8(a) functions as follows. With reference to FIG. 8(b), after the image is input and stored in the image buffer 3, the histogram-type remapping processor 11 determines the color (i.e., the color space coordinate) of each image pixel of the stored image (step 85). Next, the histogram-type remapping processor 11 generates a color space histogram which includes a curve representing the color composition of the image (step S6). An example of a color space histogram representing color characteristics of an image to be reproduced is shown in FIG. 9. As can be seen from FIG. 9, the horizontal axis of the color space histogram represents color, while the vertical axis represents the number of pixels of the image stored in the input buffer 3 which correspond to each separate color. For example, if five pixels of the stored image were a first shade of blue, then the height of the color composition curve above the point on the horizontal axis corresponding to the first shade of blue would be five vertical units.

After generating the color space histogram, the histogram-type remapping processor 11 identifies local maxima of the histogram (step S7). Next, in step S8, all of the colors between each local maximum and the nearest minimum on each side of the local maximum are grouped together (i.e., designated as belonging to the same set of colors) by the histogram-type remapping processor 11. For the sake of convenience, each set of colors, as defined above, will hereinafter be referred to as a "color feature." The color space histogram illustrated in FIG. 9 contains two of these color features.

After determining the various features associated with the stored image, the histogram-type remapping processor 11 determines an average color of each feature (step S9). The histogram-type remapping processor 11 determines the average color of a feature by totaling the color space coordinate values (e.g., the RGB values) of the pixels in the feature to yield a color space coordinate value sum, and by then dividing the sum by the number of pixels associated with the feature.

When the average color of each feature has been determined by the histogram-type processor 11, then the histogram-type processor 11 remaps each color of the features to a predetermined target color that is closest to the average color of that feature (step S10). More particularly, the histogram-type processor 11 remaps the color of each pixel of the stored image to the target color that is closest to the average color of the feature within which the color of the pixel was included prior to remapping.

Like the target colors of the first embodiment of the present invention shown in FIG. 3(a), the target colors for the apparatus shown in FIG. 8(a) are selected from a target color table stored in memory (e.g., a memory in processor 11). The target colors used in the various embodiments of the present invention are predetermined in accordance with the accuracy of the reproduction apparatus within which they are to be utilized, rather than being based on the colors which best represent a particular image input, as in conventional reproduction apparatus. In this manner, unlike conventional reproduction apparatus, the various embodiments of the present invention need not to determine features of the image to be reproduced to prior to determining the values of the target colors to be used for remapping purposes.

The remapping process performed by histogram-type remapping processor 11 is illustrated schematically in FIG. 10. More particularly, FIG. 10 schematically illustrates the remapping of two features in the red and reddish-green regions of RGB color space that may be performed by the histogram-type remapping processor 11. An effect similar to that of FIG. 10 would be achieved if the apparatus of FIG. 8(a) were used to remap features in color regions of L*a*b* color space.

In accordance with the flow chart of FIG. 8(b), a plurality of features may each be remapped to a target color using the apparatus shown in FIG. 8(a). The target color to which the colors of each feature are remapped is the target color from the target color table that is the closest to the average color of the feature. After the target colors of the image stored in input buffer 3 of FIG. 8(a) are remapped by the histogram-type remapping processor 11, the image is sent to the color correction circuitry 5 (step S11 of FIG. 11(b)), and then output by the image output device 7.

The apparatus shown in FIG. 8(a) is capable of reproducing simple graphics with low-noise solid areas and acceptable color fidelity. Although the apparatus of FIG. 8(a) overcomes various problems associated with the reproduction apparatus shown in FIGS. 1 and 3(a), reproductions produced by the apparatus shown in FIG. 8(a) sometimes include jagged edges (also known as "jaggies") at boundaries between solid color patches. The jagged edges result from the color characteristics of the pixels located at the sold color patch boundaries. Because these pixels have an intermediate color (i.e., a color between the colors of the solid color patches bordering the solid color patch boundaries), some will be remapped by histogram-type remapping processor 11 to the target color associated with one of the bordering solid color patches, while others will be remapped to the target color associated with another of the bordering solid color patches. Such remapping results in the production of jagged edges at the solid color patch boundaries of the reproduction, and the contouring of color sweeps contained in the original image.

FIG. 11(a) shows an apparatus in accordance with a third embodiment of the present invention, which eliminates both contouring effects and the production of jagged edges at the border of solid color patches. The apparatus of FIG. 11(a) is similar to the apparatus shown in FIGS. 3(a) and 8(a), except that the apparatus of FIG. 11(a) uses a warping-type remapping processor 13 rather than a quantization-type remapping processor or a histogram-type remapping processor. Like the quantization-type remapping processor 9 of FIG. 3(a), and the histogram-type remapping processor 11 of FIG. 8(a), the warping-type remapping processor 13 of FIG. 11(a) is used to remap the colors of the image stored in image buffer 3.

The warping-type remapping processor 13 operates in accordance with software stored in a memory (not shown). In other words, the warping-type remapping processor 13 operates by performing instructions of the stored software. The characteristics of the warping-type remapping processor 13 of FIG. 11(a) will be discussed in greater detail below.

Figure 11B:
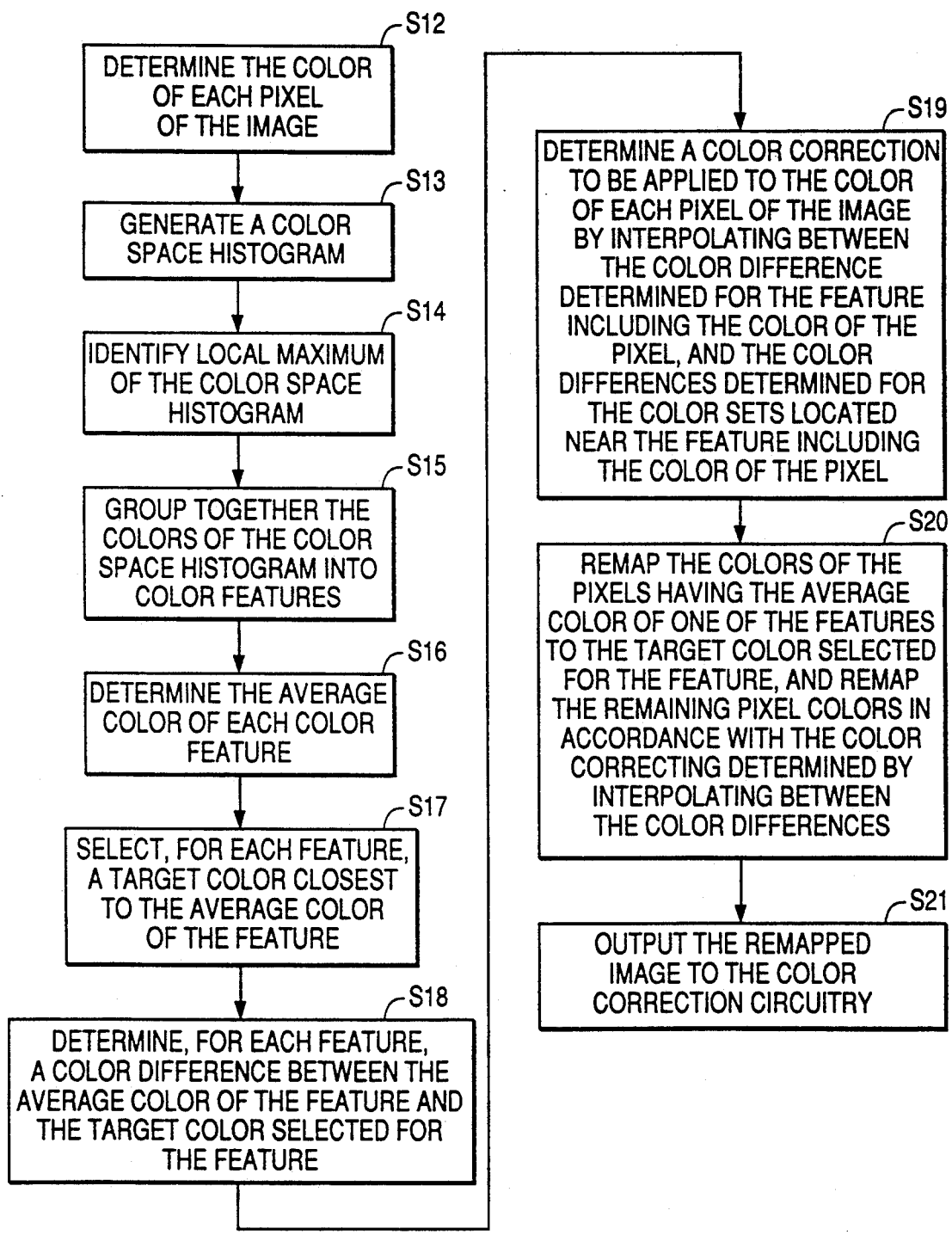
FIG. 11(b) is a flow chart illustrating a method performed by the image reproduction apparatus illustrated in FIG. 11(a)

With reference to FIG. 11(b), which is a flow chart illustrating the function of the apparatus shown in FIG. 11(a), an image is input into the image buffer 3, and then the warping-type remapping processor 13 determines the color (i.e., the color space coordinate) of each pixel of the image after it has been stored (step S12). In the same manner as the histogram-type remapping processor 11 of FIG. 8(a), the warping-type remapping processor 13 then generates a color space histogram (step S13), determines local maxima of the color space histogram (step S14), and groups together all of the colors between each local maximum and the nearest minimum on each side of the local maximum into sets of colors (step S15). As indicated previously, each set of colors may be referred to as a "color feature."

Next, like the histogram-type remapping processor 11 of FIG. 8(a), the warping-type remapping processor 13 of FIG. 11(a) determines an average color of each set of colors (i.e., the average color of each color feature) (step S16). Then, the warping-type remapping processor 13 selects a target color for each feature (step S17). The target color selected for each feature is the target color that is closest to the average color of the feature.

The remaining steps performed by the warping-type remapping processor 13 of FIG. 11(a) differ from the steps which the histogram-type remapping processor 11 of FIG. 8(a) performs to remap the colors of the image pixels. In the apparatus of FIG. 11(a), after a target color has been selected for each feature, the warping-type remapping processor 13 determines, for each feature, a color difference between the average color of the feature and the target color selected for the feature (step S18). Next, the warping-type remapping processor 13 determines a color correction to be applied to the color of each pixel of the image (step S19). The warping-type remapping processor 13 determines the color correction to be applied to each pixel color by performing an interpolation function using the color differences determined by the processor for each of the features. The details of this interpolation function will be discussed in greater detail below.

The color corrections for the pixels are determined so that the color of each image pixel that has the average color of one of the features will be remapped to the target color selected for that feature. The color corrections are also determined so that the color of each pixel of the image that has a color of one of the features other than the average color of the feature will be remapped to a color determined by the aforementioned interpolation function (described in greater detail below). The interpolation function is performed using the color differences determined by the warping-type remapping processor 13 for the various color features.

After the warping-type remapping processor 13 determines the color corrections to be applied to the colors of the pixels of the image, the processor remaps each color of each feature (step S20) in accordance with the color corrections. More particularly, the warping-type remapping processor 13 remaps the colors of the pixels that have the average color of one of the features to the target color selected for that feature, and remaps the remaining pixel colors in accordance with the color differences determined for the plurality of color features. After the image is remapped, it is sent to the image output device 7 via color correction circuitry 5 (step S21), and then output from the image output device as an image reproduction.

Figure 12:
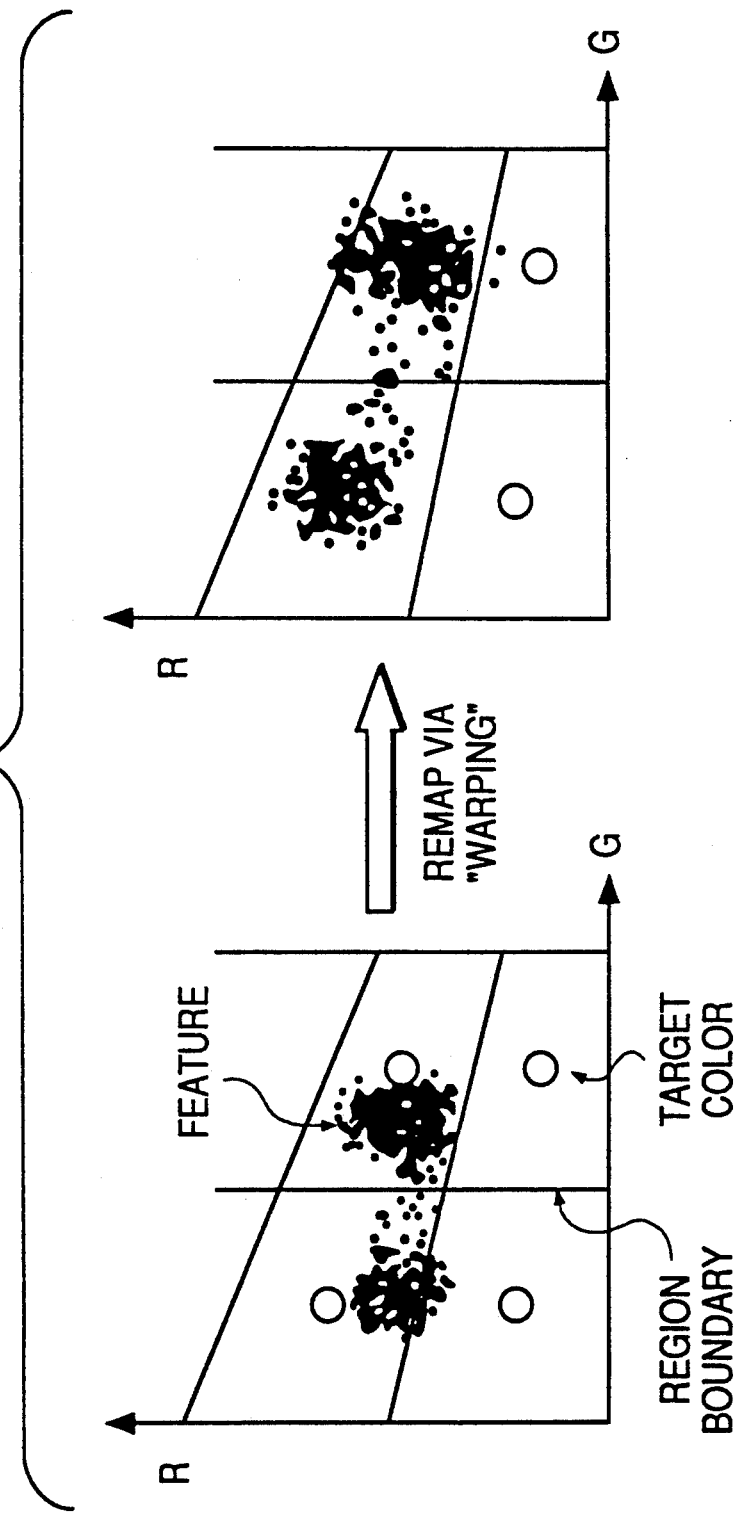
FIG. 12 is a schematic representation showing remapping in two dimensions of RGB color space using a warping-type remapping processor.

FIG. 12 is a schematic representation showing the remapping process performed by the warping-type processor 13 of FIG. 11(a). This type of remapping process will be referred to as remapping via "warping," because the remapping process essentially simulates the effect which would be achieved if the average color of each feature were remapped to the nearest target color, and the remainder of color space were warped or bent as if made of rubber.

The differences between the results produced by the apparatus of FIGS. 8(a) and 11(a) can be seen through a comparison of FIGS. 10 and 12. As can be seen from FIG. 10, histogram-type processor 11 of FIG. 8(a) remaps each color in a given feature to the same target color. On the other hand, as can be seen from FIG. 12, the warping-type remapping processor 13 of the apparatus shown in FIG. 11(a) remaps the colors of each feature such that only the pixels having the average color of the feature are remapped to a selected target color. The warping-type remapping processor 13 remaps the colors of the remaining pixels to colors determined by the color differences associated with the various color features.

The remapping performed by the warping-type remapping processor 13 of FIG. 11(a) does not upset the relationships between the colors within the features. As a result, colors that are closely related in the original document will be closely related in the reproduction or reproductions of the document. Furthermore, the remapping performed by the warping-type processor 13 does not result in image contouring or the production of jagged edges at boundaries between solid color patches. A drawback of the warping technique is that it does not suppress the build up of multigenerational noise (i.e., graininess, etc.).

A fourth embodiment of the present invention, shown in FIG. 13(a), overcomes this drawback, and the deficiencies of the apparatus shown in FIGS. 3(a), 8(a) and 11(a) discussed above. The apparatus of FIG. 13(a) is similar to the apparatus shown in FIGS. 3(a), 8(a) and 11(a), except that it uses a composite-type processor 15 rather than a processor of the quantization, histogram or warping type. The apparatus shown in FIG. 13(a) functions as follows.

The composite-type remapping processor 15 operates in accordance with software stored in a memory (not shown). In other words, the composite-type remapping processor 15 operates by performing instructions of the stored software. The characteristics of the composite-type remapping processor 15 of FIG. 13(a) will be discussed in greater detail below.

Figure 13B:
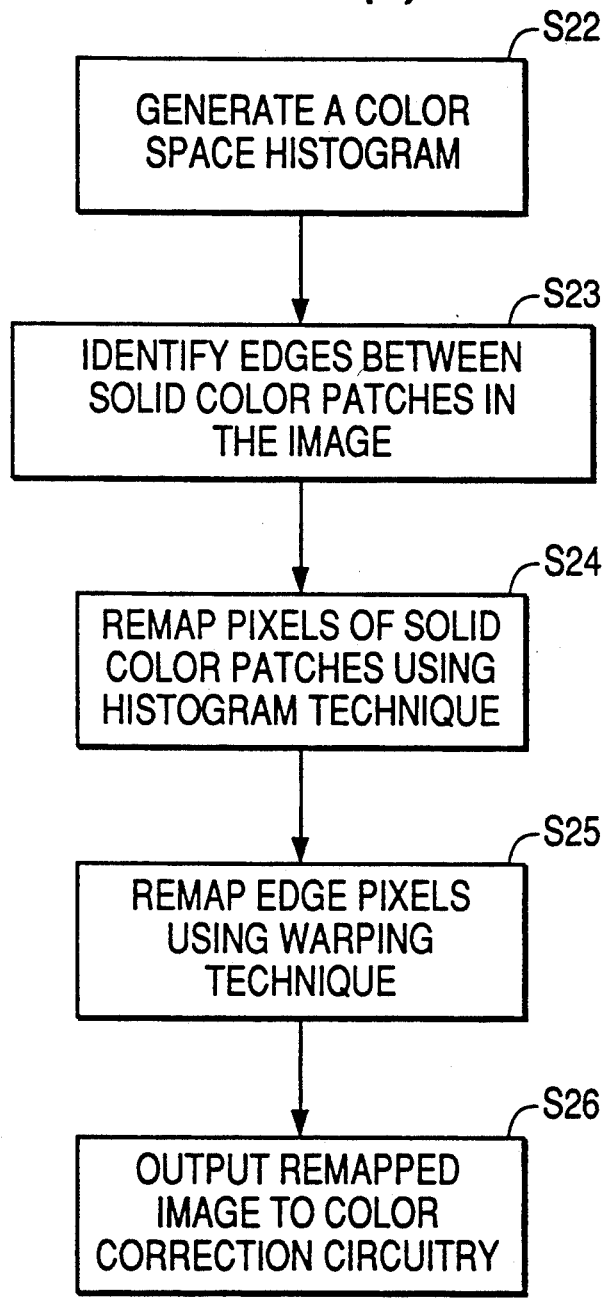
FIG. 13(b) is a flow chart illustrating a method performed by the image reproduction apparatus illustrated in FIG. 13(a)

FIG. 13(b) is a flow chart illustrating the function of the apparatus shown in FIG. 13(a). In FIG. 13(b), after an image to be reproduced is input and stored in image buffer 3, the composite-type remapping processor 15 generates a color space histogram of the image (step S22). The manner in which the color space histogram may be generated by a processor has already been discussed in connection with the embodiment of the present invention shown in FIG. 8(a). Next, the composite-type remapping processor 15 performs an edge detection function with respect to the stored image to identify edges between solid color patches of the image (step S23). The manner in which edge detections may be performed is known in the art, and therefore further discussion of the edge detection function performed by the present invention is considered unnecessary.

After detecting the edges of the image, the composite-type remapping processor 15 remaps the pixels of all of the solid color patches (i.e., the non-edge pixels) in accordance with the remapping method discussed in connection with FIGS. 8(a), 8(b), 9 and 10 (step S24). In other words, the solid color portion pixels of the image are made to undergo the type of remapping processing performed by the histogram-type remapping processor 11 of FIG. 8(a). In this manner, each solid color portion pixel of the stored image is remapped to one of a plurality of selected target colors.

Then, the composite-type remapping processor 15 remaps the edge pixels using the warping technique discussed in connection with FIGS. 11(a), 11(b) and 12 (step S25). In other words, the type of remapping processing performed by the warping-type remapping processor 13 of FIG. 11(a) is performed for the edge pixels by the composite-type remapping processor 15. In this manner, the colors of the edge pixels having the average color of one of the features are remapped to the target colors selected for that feature, and the remaining edge pixel colors are remapped to colors determined by the color differences determined by the composite-type remapping processor 15 for the various color features.

After the remapping performed by the composite-type remapping processor 15 is completed, the remapped image stored in image buffer 3 is output to the color correction circuitry 5 for color correction (step S26), and then is sent to the image output device 7. It should be noted that the histogram used to remap the solid color patches is also used to remap the colors of the edge pixels.

In another embodiment of the present invention, the composite-type remapping processor 15 remaps the edge pixel colors prior to the solid color portion pixels. In yet another embodiment, the composite-type remapping processor 15 remaps all of the pixel colors in an order unrelated to whether or not the pixel colors correspond to edge pixels or solid color portion pixels.

The embodiment illustrated in FIG. 13(a) uses the warping technique for remapping colors of the edge pixels in order to suppress the production of jagged edges. However, in the solid color patch areas, where viewers are most sensitive to noise, the remapping technique associated with histogram-type remapping processor 11 of FIG. 8(a) is used. In this manner, the composite-type remapping processor 15 can perform remapping in a way which will ensure that the initial reproduction (i.e., the first generation reproduction) and subsequent multigeneration reproductions will be high in quality, and free from errors. The concepts of the fourth embodiment shown in FIG. 13(a), like those of the first, second and third embodiments of the present invention, can be extended to pictorial film printing, color palette selection in computer graphics, and the reproduction of graphic images including color sweeps.

Various methods can be used for performing the remapping processes carried out by the present invention. For example, the remapping performed by the histogram-type remapping processor 11 of FIG. 8(a) can be carried out by using a 32×32×32 point color space array or table established in the remapping processor (e.g., the memory of the remapping processor), with each bit or point of the array corresponding to a different color or color space coordinate. In this method, after the histogram-type remapping processor 11 analyzes the image stored in image buffer 3, the processor determines the number of pixels associated with each coordinate of the color space array, and stores this information in the memory of the processor 11. Next, the processor 11 uses the histogram generation method described previously in connection with FIG. 8(a) to determine the various color features associated with the image. The data relating to the histogram and the color features can be recorded by the histogram-type remapping processor 11 as, for example, a set of linked lists. Each feature is represented as a linked list of pointers to the color coordinates of the array which are included in each feature. The linked list for each feature can be processed to derive the total number of pixels per feature, and the average color (e.g., the average RGB value) of each feature. The data for the features are also recorded as a linked list.

After the histogram-type remapping processor 11 establishes the list of features, it may reassign each of the color coordinates of the color space array to a target color selected from a target color table in the processor 11. As indicated previously, all of the color coordinates of the feature are to be reassigned by the histogram-type remapping processor 11 to the target color from the table that is closest to the average color of the feature.

Following the reassignment of the color coordinates of the color space array, the reassigned color coordinates are used by the processor 11 to remap the corresponding pixels of the image stored in the image buffer 3. As an alternative to reassigning the color coordinates of the color space array in the processor 11 prior to remapping the image in the image buffer 3, the stored image could be remapped using the target color information selected by the processor for each feature by directly applying such information to the appropriate pixel locations in the image buffer.

Like the remapping performed by the histogram-type remapping processor 11 of FIG. 8(a), there are various ways in which the remapping performed by the warping-type remapping processor 13 of FIG. 11(a) can be carried out. In particular, there are various ways in which the color of each image pixel that has a color of one of the features other than the average color of the feature can be remapped to simulate the warping of at least a portion of color space (e.g., the portion of color space excluding the average colors of the features).

FIG. 14 shows one way in which the remapping performed by the warping-type remapping processor 13 of FIG. 11(a) can be carried out. More particularly, FIG. 14, which is a schematic representation in RGB color space showing a remapping function associated with the warping-type remapping technique, illustrates that a $1/(d_i)^4$ weighting method can be used to determine color corrections to be applied to the pixel colors, and to remap the pixel colors in accordance with such color corrections. This weighting method, which carried out by performing various interpolations, is described below.

The $1/(d_i)^4$ weighting method used by the warping-type remapping processor 13 of FIG. 11(a) is similar to the so-called "vector-correction method" discussed in the Laihanen articles incorporated by reference above, except that, for example, the $1/(d_i)^4$ weighting method always uses the number 4 as the exponential value for each distance measurement $d_i$, and the $1/(d_i)^4$ weighting method uses all previously measured vectors rather than only the k (e.g., 6) closest measured vectors. Thus, the appropriate equation for the $1/(d_i)^4$ weighting method is as follows:

$$E = \frac{\sum_{i=1}^{n} \frac{E_i}{(d_i)^4}}{\sum_{i=1}^{n} \frac{1}{(d_i)^4}} \quad (1)$$

where

E = the desired remapping vector (indicating the color correction to be applied to a pixel image color coordinate P);

$E_i$ = a calibration vector representing the color difference associated with the i-th feature;

$d_i$ = the distance between vector $E_i$ and a color coordinate P to be remapped;

n = the number of features; and i refers to one of the calibration vectors.

The weighting method equation will now be discussed with reference to FIG. 14. When performing the $1/(d_i)^4$ weighting method, the warping-type remapping processor 13 selects a target color for each one of the features (i.e., the target color that is closest to the average color of the feature), and determines a color difference for each one of the features. The color difference for a given feature is the difference between the average color of the feature and the target color selected for that feature.

In FIG. 14, color coordinates $R_{f1}$, $G_{f1}$ and $R_{f2}$, $G_{f2}$ represent the average color of the first feature and a second feature, respectively, and color coordinates $R_{01}$, $G_{01}$ and $R_{02}$, $G_{02}$ respectively represent the average target color selected for the first and second features. Thus, $E_1$ and $E_2$ are vectors, which will be referred to as calibration vectors, respectively representing the difference in color (i.e., the color difference) between the average color of the first feature and the target color selected for the first feature, and the difference in color (i.e., the color difference) between the average color of the second feature and the target color selected for the second feature.

After a calibration vector has been determined for each feature by the warping-type remapping processor 13 of FIG. 11(a), the processor determines the color corrections to be applied to each of the colors of the image pixels. In other words, the processor 13 determines a remapping vector E for each image pixel color coordinate P. The remapping vector E indicates the color coordinate P' to which the color coordinate P of each pixel is to be remapped. The color coordinate value P' determined for each pixel color coordinate P is ascertained using the $1/(d_i)^4$ weighting method equation.

Applying the $1/(d_i)^4$ weighting method to the example illustrated in FIG. 14, after the calibration vectors $E_1$ and $E_2$ and distances $d_1$ and $d_2$ are determined, the value of the remapping vector E is determined by the warping-type remapping processor 13 using equation (1) from above. Substituting the values from FIG. 14 into equation (1), the value of the remapping vector E can be determined by the warping-type remapping processor 13 for the example illustrated in FIG. 14 as follows:

$$E = \frac{\frac{E_1}{(d_1)^4} + \frac{E_2}{(d_2)^4}}{\frac{1}{(d_1)^4} + \frac{1}{(d_2)^4}} \quad (2)$$

Thereafter, using the value determined for the remapping vector E, the color coordinate of point P' can easily be determined.

In operation, the warping-type remapping processor 13 utilizes the calibration vector $E_i$ from each feature to determine the remapping vector E for each pixel color coordinate P to be remapped. In other words, all of the calibration vectors $E_i$ are used to determine each of the remapping vectors E. Thus, if ten features exist, the value n in equation (1) will be ten. After the calibration vectors have been determined, the processor 13 analyzes each image pixel stored in the image buffer 3, and remaps each pixel color to an appropriate P' color coordinate determined in accordance with the weighting method equation (1) described above. Due to the inherent nature of the $1/(d_i)^4$ weighting method, the colors of the image pixels having the average color of one of the features will always be remapped to the target color selected for that feature, while the remaining image pixel colors will be remapped to colors other than the target colors selected for the features.

A faster way to determine the P' color coordinate for each image pixel color coordinate P to be remapped will now be discussed. The method to be described is faster because it uses a predetermined value array which eliminates the need to apply the weighting method equation (1) to each pixel stored in the image buffer.

The faster method entails the following steps. First, as in the previously described weighting method, a calibration vector $E_i$ is determined for each feature. Then, remapping vector E values for approximately 4,000 different P color coordinates are determined using the weighting method equation (1), and the values resulting from such coordinates are stored as a $16 \times 16 \times 16$ point array in the memory of the remapping processor 13. It should be noted that the P values used to generate the $16 \times 16 \times 16$ point array are predetermined by the remapping processor 13, and have no particular correspondence to the image stored in the image buffer 3.

Using the $16 \times 16 \times 16$ point array, the remapping processor 13 analyzes each image pixel stored in the image buffer 3 to determine the color to which that image pixel is to be remapped. This determination is faster than in the previous method because it does not require the determination of a P' color coordinate value for each image pixel that is analyzed. More particularly, for the image pixels having P color coordinate values that have already been predetermined and stored in the $16 \times 16 \times 16$ point array, the corresponding P' coordinates can be determined by simply performing a look-up function with respect to the array. This decreases the amount of repetitive determinations performed by warping-type remapping processor 13, and increases the processing speed of the remapping processor.

The warping-type remapping processor 13 may use various types of interpolation methods to determine the P' values for the image pixel colors that are not incorporated in the $16 \times 16 \times 16$ point array (i.e., the image pixel colors for which P' values have not been predetermined). For example, polynomial interpolations or trilinear interpolations, which are known in the art, can be used by the warping-type remapping processor 13 for this purpose. Alternatively, interpolations such as those described in U.S. Pat. No. 4,275,413, incorporated herein by reference, can be used. After the P' color coordinate value for each pixel of the image stored in the image buffer 3 is determined, the stored image can be remapped and output via the color correction circuitry 5 from the image output device 7.

It should be noted that each of the embodiments of the present invention can be carried out without storing the image to be remapped in an image buffer (i.e., the embodiments of the present invention could be carried out using apparatus that do not include an image buffer, or that do not use an image buffer for remapping purposes). The embodiments of the present invention can be carried out without the use of an image buffer by scanning the original twice (i.e., by scanning the image a first time to determine a histogram for the image, and by scanning the image a second time to remap or process the pixels of the image).

The foregoing description of the preferred embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. An image processing method, the method performed by a data processing system having a memory, and comprising the steps of:
   (a) grouping colors of a multi-pixel image stored in the memory and having a color composition into sets of colors;
   (b) determining the average color of each set of colors;
   (c) selecting a target color, for each set of colors, from a plurality of predetermined target colors, the selected target color being the predetermined target color that is closest to the average color of the set; and
   (d) remapping the color of each pixel of the image stored in the memory to the target color selected for the set including the pixel.

2. The method of claim 1, wherein the grouping step (a) comprises:
   (e) generating a color space histogram corresponding to the color composition of the multi-pixel image, locating local maxima of the color space histogram, and identifying points in the color space histogram that are minima located between the maxima of the color space histogram; and
   (f) for each set of colors, selecting as the colors of the set those colors of the multi-pixel image corresponding to the points in the color space histogram that surround a local maximum.

3. The method of claim 1, wherein the determining step (b) comprises:
   (e) determining the number of pixels of the multi-pixel image associated with each set of colors, each pixel having a numerical color value representing a color of the multi-pixel image;
   (f) adding all of the color values of the pixels associated with each set of colors to determine a color value sum for each set of colors; and
   (g) dividing the color value sum of each set of colors by the number of pixels associated with the set to determine an average color value for each set, the average color value of the set representing the average color of the set.

4. An image processing method, the method performed by a data processing system having a memory, and comprising the steps of:
   (a) grouping colors of a multi-pixel image stored in the memory and having a color composition into sets of colors;
   (b) determining the average color of each set of colors;
   (c) selecting a target color for each set of colors from a plurality of predetermined target colors, the selected target color being the predetermined target color that is closest to the average color of the set;
   (d) determining, for each set, a difference in color between the average color of the set and the target color selected for the set;
   (e) remapping the color of each pixel of the image stored in the memory that has the average color of the set which includes the pixel to the target color selected for the set; and
   (f) remapping the color of each pixel of the image stored in the memory that has a color of the set which includes the pixel other than the average color of the set to a color determined in accordance with the color difference between the average color of the set and the target color selected for the set, and in accordance with the color differences for other ones of the sets of colors.

5. The method of claim 4, wherein the grouping step (a) comprises:
   (g) generating a color space histogram corresponding to the color composition of the multi-pixel image, locating local maxima of the color space histogram, and identifying points in the color space histogram that are minima located between the maxima of the color space histogram; and
   (h) for each set of colors, selecting as the colors of the set those colors of the multi-pixel image corresponding to the points in the color space histogram that surround a local maximum.

6. The method of claim 4, wherein the determining step (b) comprises:
   (g) determining the number of pixels of the multi-pixel image associated with each set of colors, each pixel having a numerical color value representing a color of the multi-pixel image;
   (h) adding all of the color values of the pixels associated with each set of colors to determine a color value sum for each set of colors; and
   (i) dividing the color value sum of each set of colors by the number of pixels associated with the set to determine an average color value for each set, the average color value of the set representing the average color of the set.

7. The method of claim 4, wherein the remapping step (f) is performed by interpolating between the color difference between the average color of the set and the target color selected for the set, and the color differences for other ones of the sets of colors.

8. An image processing method, the method performed by a data processing system having a memory, and comprising the steps of:
   (a) grouping portions of a multi-pixel image stored in the memory and having a color composition into boundary portions, located between different colored patches of the image, and non-boundary portions;
   (b) grouping colors of the image into sets of colors, the sets of colors including colors from the boundary portions and the non-boundary portions of the image;
   (c) determining the average color of each set of colors;
   (d) selecting a target color, for each set of colors, from a plurality of predetermined target colors, the selected target color being the predetermined target color that is closest to the average color of the set;
   (e) remapping the color of each non-boundary portion pixel of the image stored in the memory to the target color selected for the set which includes that non-boundary portion pixel;

(f) remapping the color of each of certain ones of the boundary portion pixels of the image stored in the memory to the target color selected for the set which includes that boundary portion pixel.

9. The method of claim 8, wherein the remapping step (f) comprises the steps of:

(g) remapping the color of each pixel in the boundary portion of the image stored in the memory that has the average color of the set which includes the pixel to the target color selected for the set; and (h) remapping the color of each pixel in the boundary portion of the image stored in the memory that has a color of the set which includes the pixel other than the average color of the set to a color determined in accordance with the color difference between the average color of the set and the target color selected for the set, and in accordance with the color differences for other ones of the sets of colors.

10. The method of claim 8, wherein the grouping step (b) comprises:

(g) generating a color space histogram corresponding to the color composition of the multi-pixel image, locating local maxima of the color space histogram, and identifying points in the color space histogram that are minima located between the maxima of the color space histogram; and (h) for each set of colors, selecting as the colors of the set those colors of the multi-pixel image corresponding to the points in the color space histogram that surround a local maximum.

11. The method of claim 8, wherein the determining step (c) comprises:

(g) determining the number of pixels of the multi-pixel image associated with each set of colors, each pixel having a numerical color value representing a color of the multi-pixel image;

(h) adding all of the color values of the pixels associated with each set of colors to determine a color value sum for each set of colors; and (i) dividing the color value sum of each set of colors by the number of pixels associated with the set to determine an average color value for each set, the average color value of the set representing the average color of the set.

12. The method of claim 9, wherein the remapping step (h) is performed by interpolating between the color difference between the average color of the set and the target color selected for the set, and the color differences for other ones of the sets of colors.

13. An image processing apparatus, in a data processing system having a memory, comprising:

means for grouping colors of a multi-pixel image stored in the memory and having a color composition into sets of colors;

means for determining the average color of each set of colors;

means for selecting a target color, for each set of colors, from a plurality of predetermined target colors, the selected target color being the predetermined target color that is closest to the average color of the set; and means for remapping the color of each pixel of the image stored in the memory to the target color selected by the selecting means for the set including the pixel.

14. The apparatus of claim 13, wherein the grouping means comprises:

means for generating a color space histogram corresponding to the color composition of the multi-pixel image, locating local maxima of the color space histogram, and identifying points in the color space histogram that are minima located between the maxima of the color space histogram; and means for selecting as the colors of each set those colors of the multi-pixel image corresponding to the points in the color space histogram that surround a local maximum.

15. The apparatus of claim 13, wherein the determining means comprises:

means for determining the number of pixels of the multi-pixel image associated with each set of colors, each pixel having a numerical color value representing a color of the multi-pixel image;

means for adding all of the color values of the pixels associated with each set of colors to determine a color value sum for each set of colors; and means for dividing the color value sum of each set of colors by the number of pixels associated with the set to determine an average color value for each set, the average color value of the set representing the average color of the set.

16. An image processing apparatus, in a data processing system having a memory, comprising:

means for grouping colors of a multi-pixel image stored in the memory and having a color composition into sets of colors;

means for determining the average color of each set of colors;

means for selecting a target color for each set of colors from a plurality of predetermined target colors, the selected target color being the predetermined target color that is closest to the average color of the set;

means for determining, for each set, a difference in color between the average color of the set and the target color selected for the set;

means for remapping the color of each pixel of the image stored in the memory that has the average color of the set which includes the pixel to the target color selected for the set; and means for remapping the color of each pixel of the image stored in the memory that has a color of the set which includes the pixel other than the average color of the set to a color determined in accordance with the color difference between the average color of the set and the target color selected for the set, and in accordance with the color differences for other ones of the sets of colors.

17. The apparatus of claim 16, wherein the grouping means comprises:

means for generating a color space histogram corresponding to the color composition of the multi-pixel image, locating local maxima of the color space histogram, and identifying points in the color space histogram that are minima located between the maxima of the color space histogram; and means for selecting as the colors of each set those colors of the multi-pixel image corresponding to the points in the color space histogram that surround a local maximum.

18. The apparatus of claim 16, wherein the average color determining means comprises:

means for determining the number of pixels of the multi-pixel image associated with each set of colors, each pixel having a numerical color value representing a color of the multi-pixel image;

means for adding all of the color values of the pixels associated with each set of colors to determine a color value sum for each set of colors; and means for dividing the color value sum of each set of colors by the number of pixels associated with the set to determine an average color value for each set, the average color value of the set representing the average color of the set.

19. The apparatus of claim 16, wherein the color determined in accordance with the color difference between the average color of the set and the target color selected for the set, and in accordance with the color differences for other ones of the sets of colors, is determined by interpolating between the color difference between the average color of the set and the target color selected for the set, and the color differences for other ones of the sets of colors.

20. An image processing apparatus, in a data processing system having a memory, comprising:
   means for grouping portions of a multi-pixel image stored in the memory and having a color composition into boundary portions, located between different colored patches of the image, and non-boundary portions;
   means for grouping colors of the image into sets of colors, the sets of colors including colors from the boundary portions and the non-boundary portions of the image;
   means for determining the average color of each set of colors;
   means for selecting a target color, for each set of colors, from a plurality of predetermined target colors, the selected target color being the predetermined target color that is closest to the average color of the set;
   first means for remapping the color of each non-boundary portion pixel of the image stored in the memory to the target color selected for the set which includes the non-boundary portion pixel; and
   second means for remapping the color of each of certain ones of the boundary portion pixels of the image stored in the memory to the target color selected for the set which includes the boundary portion pixel.

21. The apparatus of claim 20, wherein the second remapping means comprises:
   means for remapping the color of each pixel in the boundary portion of the image stored in the memory that has the average color of the set which includes the pixel to the target color selected for the set; and
   means for remapping the color of each pixel in the boundary portion of the image stored in the memory that has a color of the set which includes the pixel other than the average color of the set to a color determined in accordance with the color difference between the average color of the set and the target color selected for the set, and in accordance with the color differences for other ones of the sets of colors.

22. The apparatus of claim 20, wherein the color grouping means comprises:

means for generating a color space histogram corresponding to the color composition of the multi-pixel image, locating local maxima of the color space histogram, and identifying points in the color space histogram that are minima located between the maxima of the color space histogram; and means for selecting as the colors of each set those colors of the multi-pixel image corresponding to the points in the color space histogram that surround a local maximum.

23. The apparatus of claim 20, wherein the average color determining means comprises:
   means for determining the number of pixels of the multi-pixel image associated with each set of colors, each pixel having a numerical color value representing a color of the multi-pixel image;
   means for adding all of the color values of the pixels associated with each set of colors to determine a color value sum for each set of colors;
   means for dividing the color value sum of each set of colors by the number of pixels associated with the set to determine an average color value for each set, the average color value of the set representing the average color of the set.

24. The apparatus of claim 21, wherein the color determined in accordance with the color difference between the average color of the set and the target color selected for the set, and in accordance with the color differences for other ones of the sets of colors, is determined by interpolating between the color difference between the average color of the set and the target color selected for the set, and the color differences for other ones of the sets of colors.

25. An image processing method, the method performed by a data processing system having a memory, and comprising the steps of:
   (a) grouping colors of a multi-pixel image having a color composition into sets of colors;
   (b) determining the average color of each set of colors;
   (c) selecting a target color, for each set of colors, from a plurality of predetermined target colors, the selected target color being the predetermined target color that is closest to the average color of the set; and
   (d) remapping the color of each pixel of the image to the target color selected for the set including the pixel.

26. An image processing method, the method performed by a data processing system having a memory, and comprising the steps of:
   (a) grouping colors of a multi-pixel image having a color composition into sets of colors;
   (b) determining the average color of each set of colors;
   (c) selecting a target color for each set of colors from a plurality of predetermined target colors, the selected target color being the predetermined target color that is closest to the average color of the set;
   (d) determining, for each set, a difference in color between the average color of the set and the target color selected for the set;
   (e) remapping the color of each pixel of the image that has the average color of the set which includes the pixel to the target color selected for the set; and
   (f) remapping the color of each pixel of the image that has a color of the set which includes the pixel other than the average color of the set to a color determined in accordance with the color difference between the average color of the set and the target color selected for the set, and in accordance with the color differences for other ones of the sets of colors.

27. An image processing method, the method performed by a data processing system having a memory, and comprising the steps of:
 (a) grouping portions of a multi-pixel image having a color composition into boundary portions, located between different colored patches of the image, and non-boundary portions;
 (b) grouping colors of the image into sets of colors, the sets of colors including colors from the boundary portions and the non-boundary portions of the image;
 (c) determining the average color of each set of colors;
 (d) selecting a target color, for each set of colors, from a plurality of predetermined target colors, the selected target color being the predetermined target color that is closest to the average color of the set;
 (e) remapping the color of each non-boundary portion pixel of the image to the target color selected for the set which includes the non-boundary portion pixel; and
 (f) remapping the color of each of certain ones of the boundary portion pixels of the image to the target color selected for the set which includes that boundary portion pixel.

* * * * *